US012627565B1

(12) United States Patent
Wojtowicz et al.

(10) Patent No.: US 12,627,565 B1
(45) Date of Patent: May 12, 2026

(54) CONTROL PLANE CONNECTIVITY INTERMEDIARIES BETWEEN RAN NODES AND CORE NETWORKS

(71) Applicant: Amazon Technologies, Inc., Seattle, WA (US)

(72) Inventors: Benjamin Wojtowicz, San Francisco, CA (US); Shane Ashley Hall, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 506 days.

(21) Appl. No.: 17/806,684

(22) Filed: Jun. 13, 2022

(51) Int. Cl.
| | |
|---|---|
| *H04W 76/10* | (2018.01) |
| *H04L 41/0895* | (2022.01) |
| *H04L 41/0896* | (2022.01) |
| *H04L 41/5025* | (2022.01) |
| *H04W 48/18* | (2009.01) |

(52) U.S. Cl.
CPC ...... *H04L 41/0895* (2022.05); *H04L 41/0896* (2013.01); *H04L 41/5025* (2013.01); *H04W 48/18* (2013.01)

(58) Field of Classification Search
CPC ............. H04L 41/0895; H04L 41/0896; H04L 41/5025; H04W 48/18
See application file for complete search history.

(56) References Cited

U.S. PATENT DOCUMENTS

| | | | |
|---|---|---|---|
| 8,539,079 | B2 | 9/2013 | Thireault |
| 9,125,047 | B2 | 9/2015 | Sundaresan et al. |

| | | | |
|---|---|---|---|
| 9,703,660 | B2 | 7/2017 | Cillis et al. |
| 9,838,268 | B1 * | 12/2017 | Mattson ................. H04L 41/32 |
| 9,876,851 | B2 | 1/2018 | Chandramouli et al. |
| 10,064,242 | B2 | 8/2018 | Pawar et al. |
| 10,135,702 | B2 | 11/2018 | Lahiri |
| 10,244,507 | B2 | 3/2019 | Tarlazzi et al. |
| 10,257,105 | B2 | 4/2019 | Majmundar et al. |
| 10,419,550 | B2 | 9/2019 | Nainar et al. |
| 10,581,717 | B2 | 3/2020 | Tejaprakash et al. |
| 10,594,456 | B2 | 3/2020 | Park et al. |
| 10,608,734 | B2 | 3/2020 | Barbieri et al. |
| 10,705,808 | B2 | 7/2020 | Chiosi et al. |
| 10,749,721 | B2 | 8/2020 | Fertonani et al. |

(Continued)

FOREIGN PATENT DOCUMENTS

| | | |
|---|---|---|
| WO | 2014073949 A1 | 5/2014 |

OTHER PUBLICATIONS

Li Xin et al: "QoS-Aware Service Selection in Geographically Distributed Clouds", 2013 22nd International Conference on Computer Communication and Networks (ICCCN), IEEE, Jul. 30, 2013, pp. 1-5 [retrieved on Sep. 27, 2013].

(Continued)

*Primary Examiner* — Brian J. Gillis
*Assistant Examiner* — Juan C Turriate Gastulo
(74) *Attorney, Agent, or Firm* — Robert C. Kowert; Kowert, Hood, Munyon, Rankin & Goetzel, P.C.

(57) ABSTRACT

An intermediary device is assigned for transmitting control plane messages between a RAN node of an application and a set of virtualized network functions of a core network of the application. In response to detecting that a condition has been satisfied, a configuration change is performed at the set of virtualized network functions, without causing a change to configuration of the RAN node.

20 Claims, 17 Drawing Sheets

System 100

(56) References Cited

U.S. PATENT DOCUMENTS

| | | | |
|---|---|---|---|
| 10,750,514 | B2 | 8/2020 | Fujinami |
| 10,817,409 | B2 | 10/2020 | Zeng et al. |
| 10,880,173 | B2 | 12/2020 | Seenappa et al. |
| 10,891,140 | B1 | 1/2021 | Levin |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,190,413 | B1 | 11/2021 | Priya et al. |
| 11,356,500 | B1 | 6/2022 | Gupta et al. |
| 11,375,527 | B1 * | 6/2022 | Eyuboglu .......... H04B 7/15528 |
| 11,539,582 | B1 | 12/2022 | Gupta et al. |
| 11,552,842 | B2 | 1/2023 | Barabell |
| 11,720,425 | B1 | 8/2023 | Yang |
| 11,743,117 | B2 | 8/2023 | Gupta |
| 11,800,404 | B1 | 10/2023 | Yang |
| 11,824,943 | B1 | 11/2023 | Krasilnikov et al. |
| 11,916,999 | B1 | 2/2024 | Gupta |
| 11,937,103 | B1 | 3/2024 | Krasilnikov |
| 11,985,065 | B2 | 5/2024 | Shevade et al. |
| 2012/0127151 | A1 | 5/2012 | Murakami |
| 2018/0146375 | A1 | 5/2018 | Pawar et al. |
| 2018/0365635 | A1 | 12/2018 | Lucrecio et al. |
| 2019/0042326 | A1 | 2/2019 | Chilikin |
| 2019/0158606 | A1 | 5/2019 | Guim Bernat et al. |
| 2019/0165906 | A1 | 5/2019 | Bala et al. |
| 2019/0190785 | A1 | 6/2019 | Power |
| 2019/0213029 | A1 | 7/2019 | Liu et al. |
| 2019/0289497 | A1 | 9/2019 | Rajagopal |
| 2019/0391855 | A1 | 12/2019 | Bernat et al. |
| 2019/0394826 | A1 | 12/2019 | Wang et al. |
| 2020/0007405 | A1 * | 1/2020 | Chitalia .................. H04L 41/14 |
| 2020/0092194 | A1 * | 3/2020 | Tillotson .............. H04L 45/742 |
| 2020/0245229 | A1 | 7/2020 | Horn et al. |
| 2021/0006944 | A1 | 1/2021 | Raghothaman et al. |
| 2021/0073047 | A1 | 3/2021 | Bhandaru |
| 2021/0144517 | A1 | 5/2021 | Guim Bernat et al. |
| 2021/0144555 | A1 | 5/2021 | Kim et al. |
| 2021/0243770 | A1 | 8/2021 | Roessler |
| 2021/0271517 | A1 | 9/2021 | Guim Bernat |
| 2021/0279161 | A1 | 9/2021 | Tameshige |
| 2021/0321245 | A1 * | 10/2021 | Landais .................. H04L 61/45 |
| 2022/0030117 | A1 | 1/2022 | Young et al. |
| 2022/0046084 | A1 | 2/2022 | Nair |
| 2022/0070734 | A1 | 3/2022 | Rajagopal |
| 2022/0095150 | A1 * | 3/2022 | Goel ................... H04L 67/1027 |
| 2022/0231943 | A1 * | 7/2022 | Brar ........................ H04L 45/74 |
| 2022/0377615 | A1 | 11/2022 | Radunovic |
| 2023/0025793 | A1 * | 1/2023 | Xiong ............... H04W 36/0007 |
| 2023/0104568 | A1 * | 4/2023 | Miriyala ............. H04L 41/0813 |
| | | | 718/104 |
| 2023/0269138 | A1 * | 8/2023 | Bachaspati ......... H04L 41/0886 |
| | | | 709/220 |
| 2023/0325266 | A1 | 10/2023 | Yang |
| 2023/0389091 | A1 * | 11/2023 | He ........................ H04L 67/133 |
| 2023/0409362 | A1 | 12/2023 | Shevade |
| 2023/0409363 | A1 | 12/2023 | Shevade |
| 2024/0040002 | A1 | 2/2024 | Krasilnikov et al. |
| 2024/0202153 | A1 | 6/2024 | Huang |
| 2024/0202157 | A1 | 6/2024 | Paterra |
| 2024/0205680 | A1 | 6/2024 | Paterra |
| 2024/0236178 | A1 | 7/2024 | Gupta et al. |
| 2024/0283707 | A1 * | 8/2024 | Kita ........................ H04L 41/40 |

OTHER PUBLICATIONS

Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.

Unknown, "5G; NG-RAN; Architecture Description", Technical Specification, ETSI TS 138 401, Version 16.8.0, Release 16, Jan. 2022, pp. 1-82.

U.S. Appl. No. 17/809,864, filed Jun. 29, 2022, Nikolay Kirschenmann, et al.

U.S. Appl. No. 17/806,685, filed Jun. 13, 2022, Benjamin Wojtowicz.

U.S. Appl. No. 17/808,518, filed Jun. 23, 2022, Ozgur Dural.

U.S. Appl. No. 17/820,542, filed Aug. 17, 2022, Nikolay Kirschenmann, et al.

U.S. Appl. No. 17/810,319, filed Jun. 30, 2022, Julius Mueller, at al.

U.S. Appl. No. 18/146,126, filed Dec. 23, 2022, Diwakar Gupta.

U.S. Appl. No. 18/067,651, filed Dec. 16, 2022, Frank Paterra.

U.S. Appl. No. 18/067,650, filed Dec. 16, 2022, Jiandong Huang.

U.S. Appl. No. 18/066,943, filed Dec. 15, 2022, Awaiz Ahmad Khan.

U.S. Appl. No. 18/067,654, filed Dec. 16, 2022, Frank Paterra.

U.S. Appl. No. 17/710,571, filed Mar. 31, 2022, Manjari Asawa.

U.S. Appl. No. 17/548,391, filed Dec. 10, 2021, Ammar Latif.

U.S. Appl. No. 17/364,791, filed Jun. 30, 2021, Diwakar Gupta.

U.S. Appl. No. 17/364,788, filed Jun. 30, 2021, Diwakar Gupta.

U.S. Appl. No. 17/364,779, filed Jun. 30, 2021, Diwakar Gupta.

U.S. Appl. No. 17/326,218, filed May 20, 2021, Ximeng Simon Yang.

U.S. Appl. No. 17/326,221, filed May 20, 2021, Ximeng Simon Yang.

U.S. Appl. No. 17/461,785, filed Aug. 30, 2021, Diwakar Gupta.

U.S. Appl. No. 17/807,341, filed Jun. 16, 2022, Upendra Bhalchandra Shevade et al.

U.S. Appl. No. 17/807,343, filed Jun. 16, 2022, Upendra Bhalchandra Shevade et al.

U.S. Appl. No. 17/807,344, filed Jun. 16, 2022, Upendra Bhalchandra Shevade et al.

U.S. Appl. No. 18/630,891, filed Apr. 9, 2024, Shevade, et al.

* cited by examiner

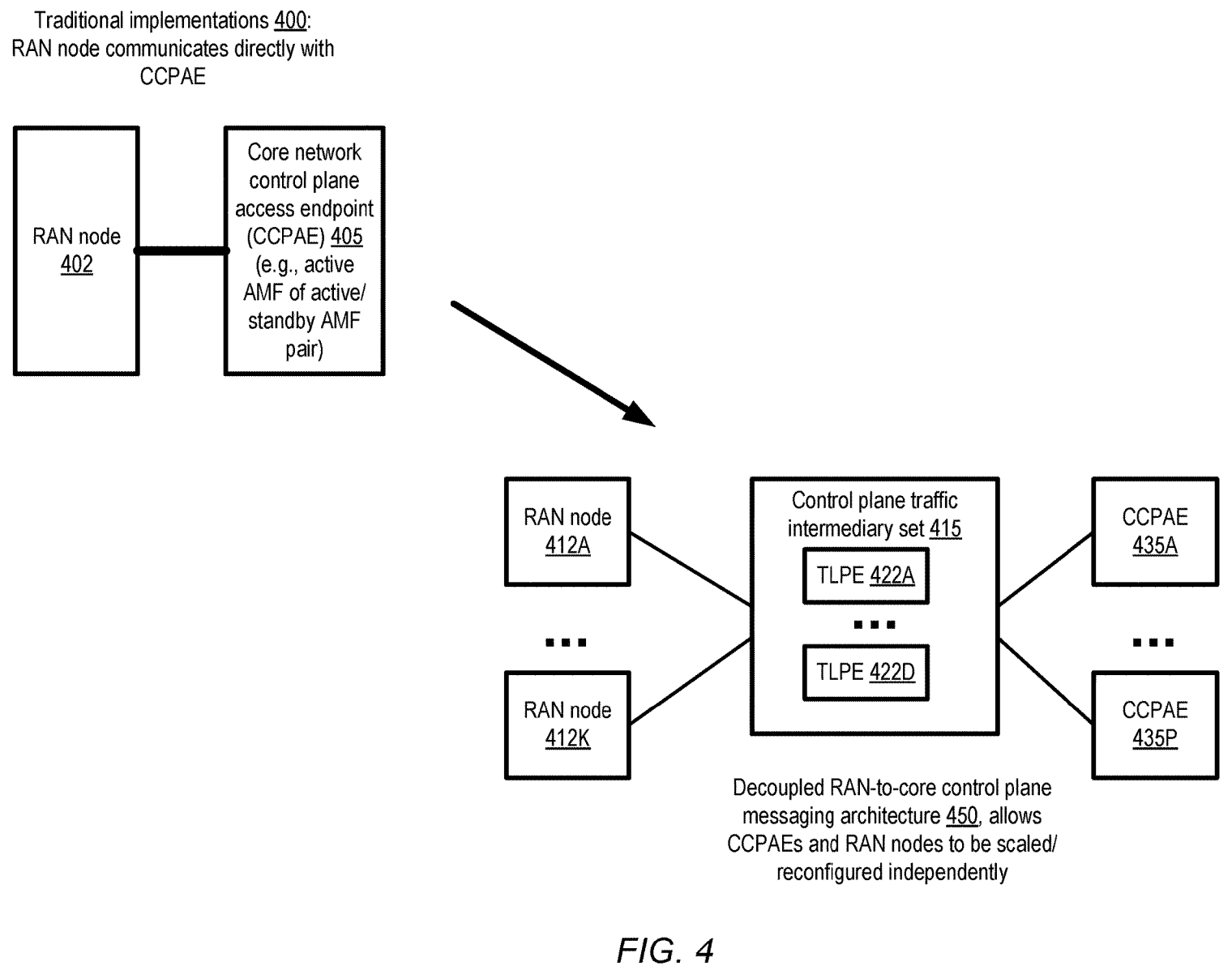

CCPAE
435A

CCPAE
435P

Control plane traffic
intermediary set 415

TLPE 422A

TLPE 422D

Decoupled RAN-to-core control plane
messaging architecture 450, allows
CCPAEs and RAN nodes to be scaled/
reconfigured independently RAN node
412A RAN node
412K Traditional implementations 400:
RAN node communicates directly with
CCPAE Core network
control plane
access endpoint
(CCPAE) 405
(e.g., active
AMF of active/
standby AMF
pair)

RAN node
402

FIG. 4

Configuration option 550A:
1 RAN node: 1 TLPE : 1 core-network control plane access endpoint (CCPAE)
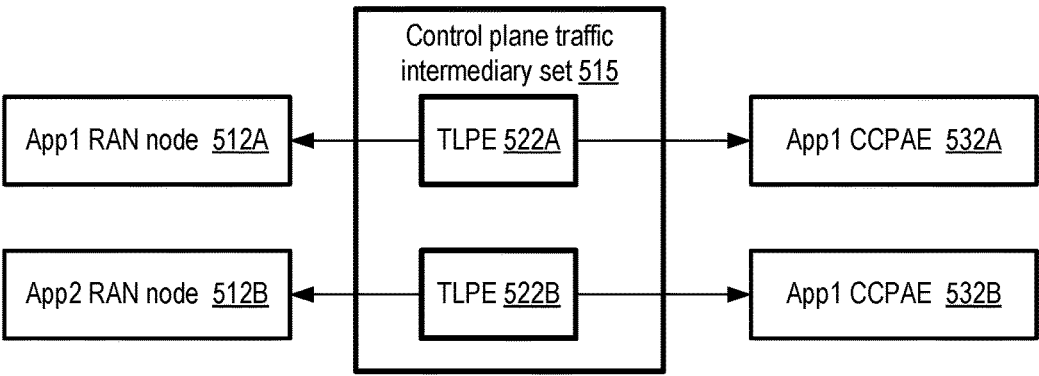
Configuration option 550B:
N RAN nodes (of a given client or application): 1 TLPE : 1 CCPAE
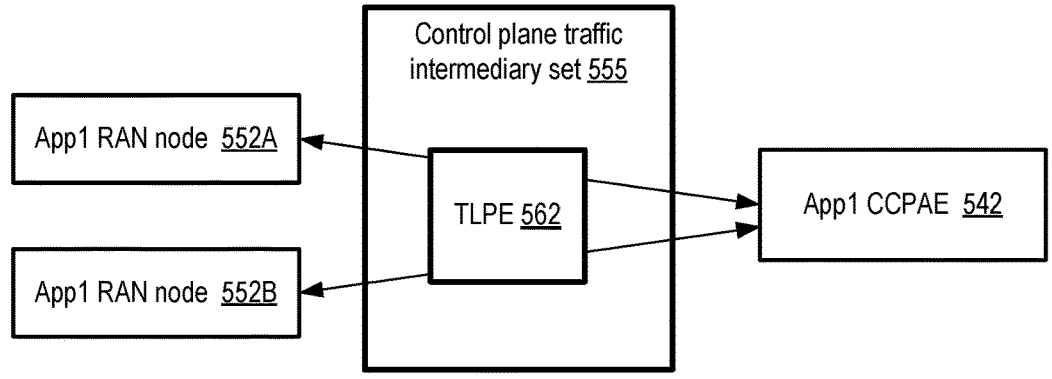
Configuration option 550C:
1 RAN nodes : 1 TLPE (acting as a load balancer) : N CCPAEs in active/active mode
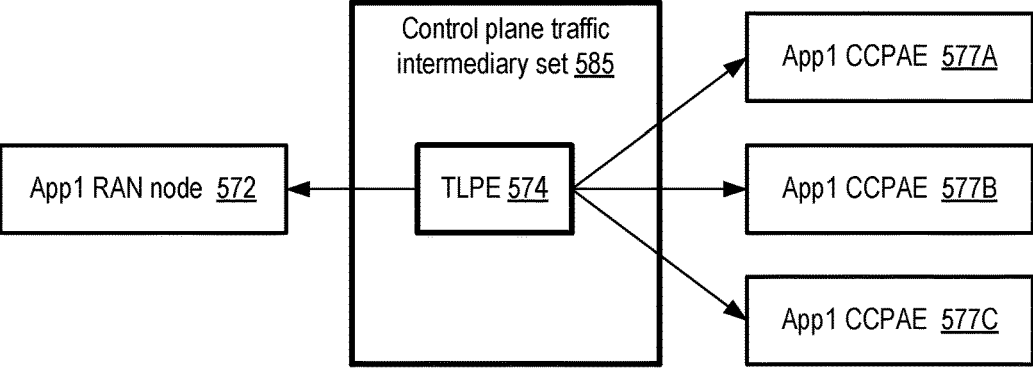
*FIG. 5*

Configuration option 650A:
Multi-tenant TLPE, single-tenant CCPAE
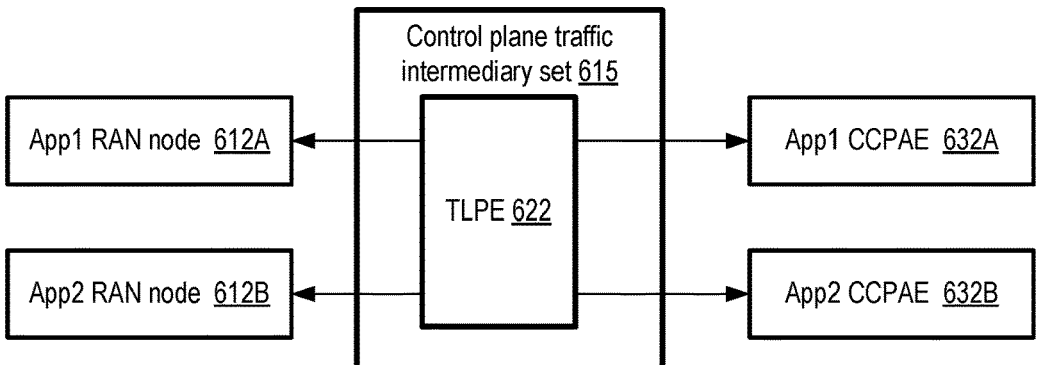
Configuration option 650B:
Multi-tenant TLPE, multi-tenant CCPAE
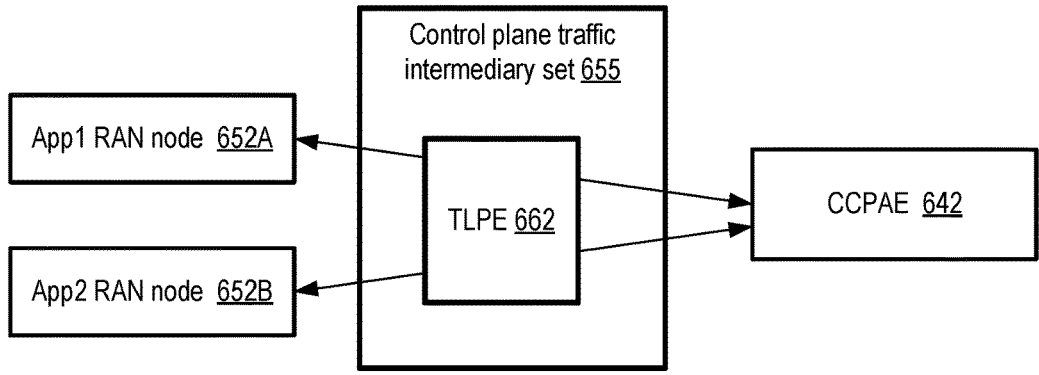
*FIG. 6*

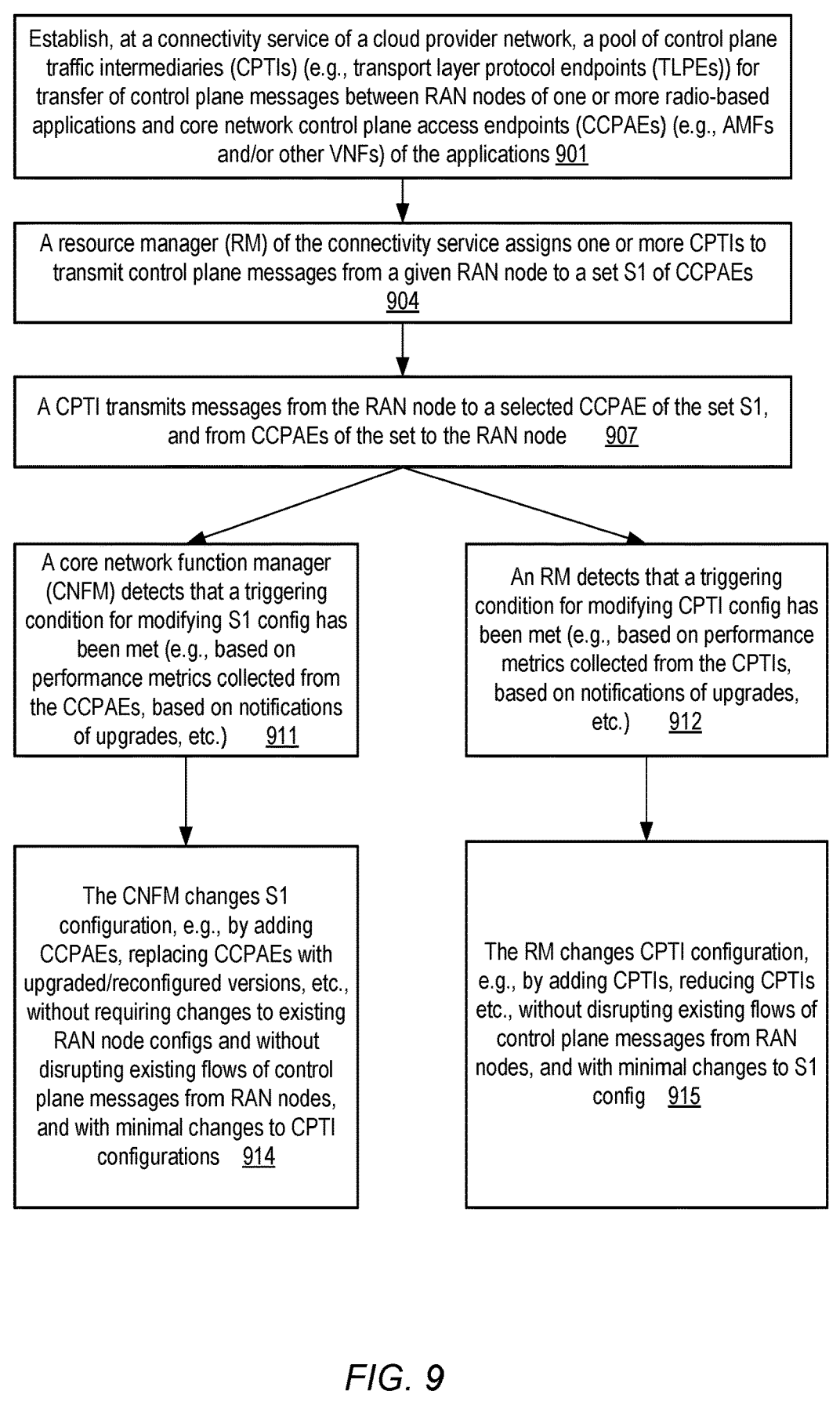

Establish, at a connectivity service of a cloud provider network, a pool of control plane traffic intermediaries (CPTIs) (e.g., transport layer protocol endpoints (TLPEs)) for transfer of control plane messages between RAN nodes of one or more radio-based applications and core network control plane access endpoints (CCPAEs) (e.g., AMFs and/or other VNFs) of the applications 901

A resource manager (RM) of the connectivity service assigns one or more CPTIs to transmit control plane messages from a given RAN node to a set S1 of CCPAEs 904

A CPTI transmits messages from the RAN node to a selected CCPAE of the set S1, and from CCPAEs of the set to the RAN node    907

A core network function manager (CNFM) detects that a triggering condition for modifying S1 config has been met (e.g., based on performance metrics collected from the CCPAEs, based on notifications of upgrades, etc.)    911

An RM detects that a triggering condition for modifying CPTI config has been met (e.g., based on performance metrics collected from the CPTIs, based on notifications of upgrades, etc.)    912

The CNFM changes S1 configuration, e.g., by adding CCPAEs, replacing CCPAEs with upgraded/reconfigured versions, etc., without requiring changes to existing RAN node configs and without disrupting existing flows of control plane messages from RAN nodes, and with minimal changes to CPTI configurations    914

The RM changes CPTI configuration, e.g., by adding CPTIs, reducing CPTIs etc., without disrupting existing flows of control plane messages from RAN nodes, and with minimal changes to S1 config    915

*FIG. 9*

Configuration option 1150A:
1 RAN node: 1 LB : 1 core-network user plane access endpoint (CUPAE)
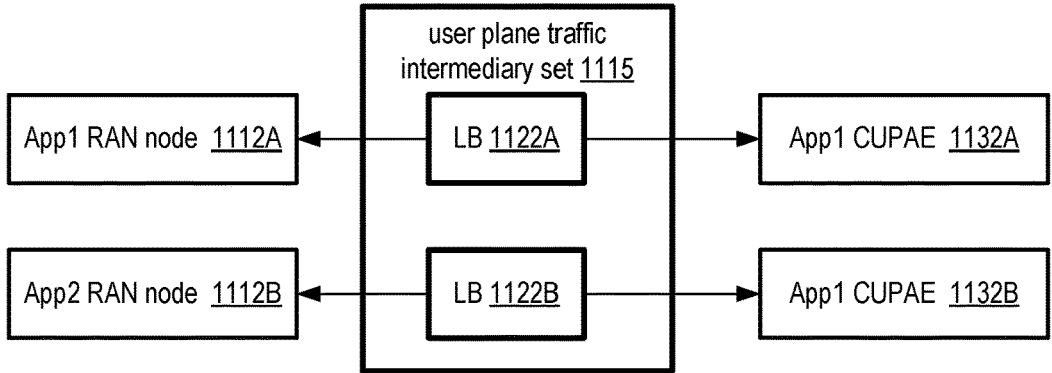
Configuration option 1150B:
N RAN nodes (of a given client or application): 1 LB : 1 CUPAE
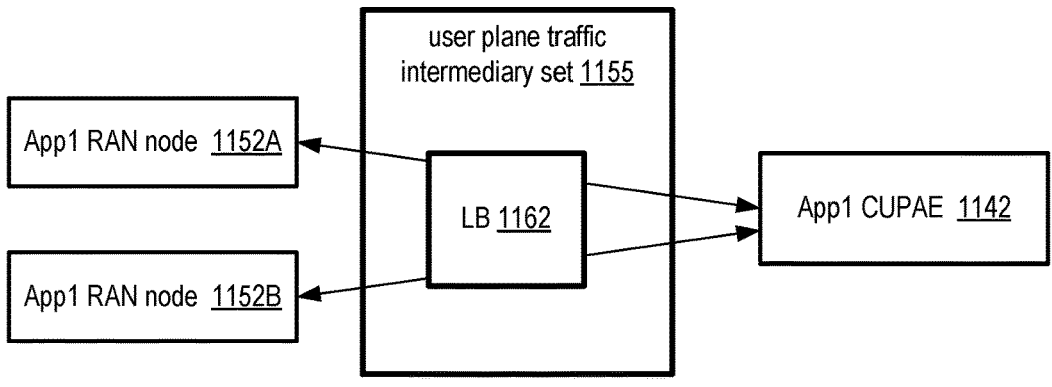
Configuration option 1150C:
1 RAN nodes : 1 LB : N CCPAEs in active/active mode
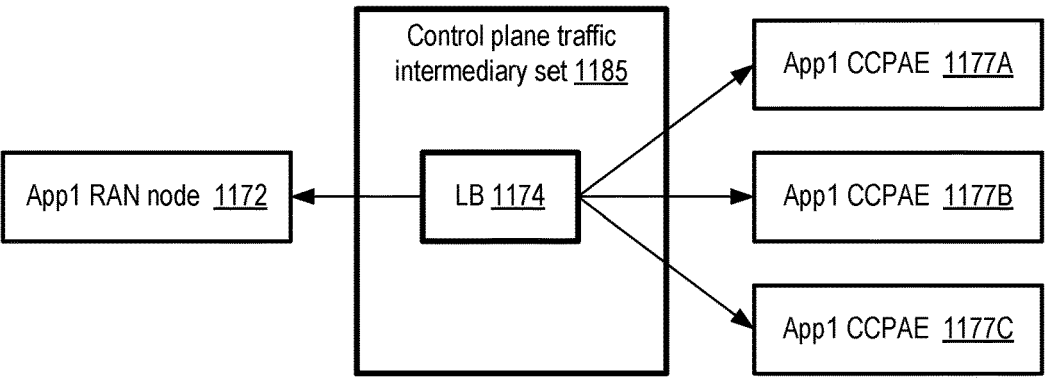
*FIG. 11*

Configuration option 1250A:
Multi-tenant LB, single-tenant CUPAE
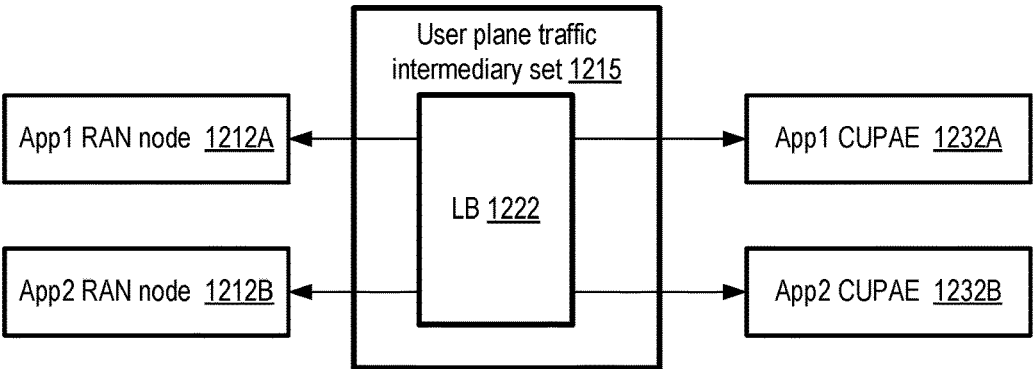
Configuration option 1250B:
Multi-tenant LB, multi-tenant CUPAE
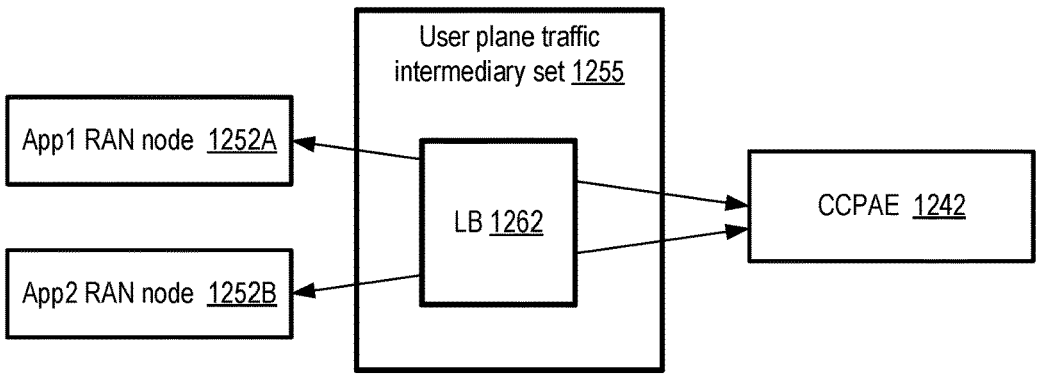
*FIG. 12*

A resource manager (RM) of a connectivity service assigns one or more user plane traffic intermediaries (UPTIs), such as load balancers implemented at a scalable load balancing service (SLBS) of a cloud provider network or other intermediaries set up and managed by the connectivity service itself, to transmit user plane messages from a given RAN node to a set S1 of core network user plane access entry points (CUPAEs) (such as UPFs); the CUPAEs of S1 may be configured in active-active mode, and the intermediaries for user plane traffic from RAN1 may be configured independently of the intermediaries for control plane traffic    1504

A UPTI transmits messages from the RAN node to a selected CUPAE of the set, and from CUPAEs of the set to the RAN node       1507

A core network function manager (CNFM) detects that a triggering condition for modifying S1 config has been met (e.g., based on performance metrics collected from the CUPAEs, based on notifications of upgrades, etc.)       1511

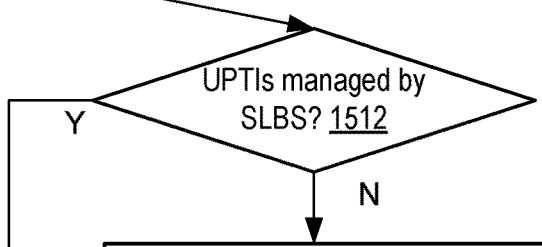

UPTIs managed by SLBS? 1512

Y

N

An RM detects that a triggering condition for modifying UPTI config has been met (e.g., based on performance metrics collected from the UPTIs, based on notifications of upgrades, etc.)       1517

The CNFM changes S1 configuration, e.g., by adding CUPAE VNF executors, replacing CUPAE VNF executors with upgraded/modified versions, etc., without requiring changes to existing RAN node configs and without disrupting existing flows of user plane messages from RAN nodes, and with minimal changes to UPTI configurations     1514

The RM changes UPTI configuration, e.g., by adding UPTIs, removing UPTIs etc., without requiring changes to existing RAN node configs and without disrupting existing flows of user plane messages from RAN nodes, and with minimal changes to S1 config     1519

SLBS manages any changes, if needed, to UPTI config       1530

FIG. 15

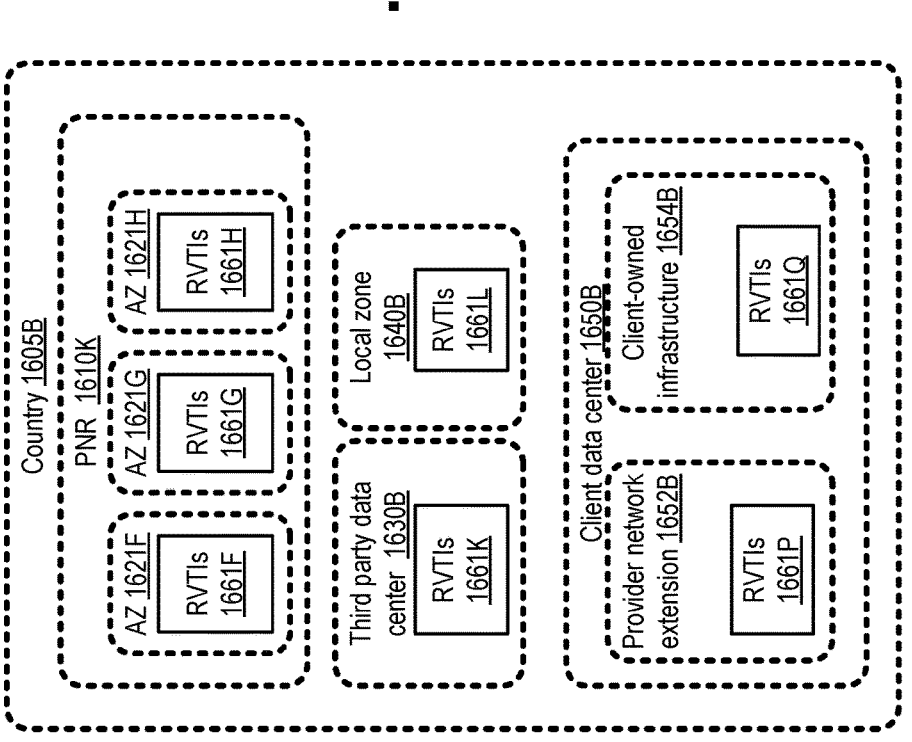
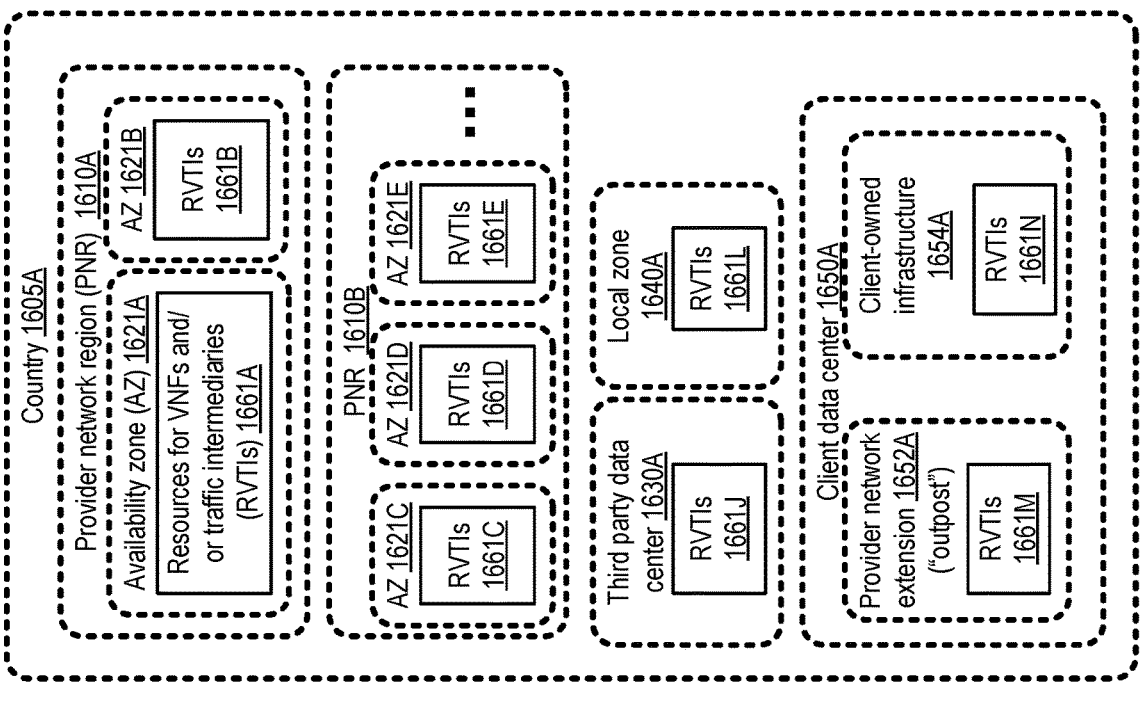
*FIG. 16*

CONTROL PLANE CONNECTIVITY INTERMEDIARIES BETWEEN RAN NODES AND CORE NETWORKS

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. As 5G technology becomes more prevalent, new types of broadband-based applications are likely to be developed and deployed, with some parts of the technology stack being executed using resources at cloud computing environments.

BRIEF DESCRIPTION OF DRAWINGS

FIG. 4 illustrates an example of a decoupled RAN-to-core control plane messaging architecture, according to at least some embodiments.

FIG. 5 and FIG. 6 illustrate examples of configuration options for RAN nodes, control plane traffic intermediaries, and core network control plane access endpoints, according to at least some embodiments.

FIG. 9 is a flow diagram illustrating aspects of operations which may be performed to manage control plane interactions between RAN nodes and core networks, according to at least some embodiments.

FIG. 11 and FIG. 12 illustrate examples of configuration options for RAN nodes, user plane traffic intermediaries, and core network user plane access endpoints, according to at least some embodiments.

FIG. 15 is a flow diagram illustrating aspects of operations which may be performed to manage user plane interactions between RAN nodes and core networks, according to at least some embodiments.

FIG. 16 illustrates examples of premises at which resources for virtualized network function execution and traffic intermediaries for messages between RAN nodes and core networks may be managed by a cloud provider service, according to at least some embodiments.

Figure 1:
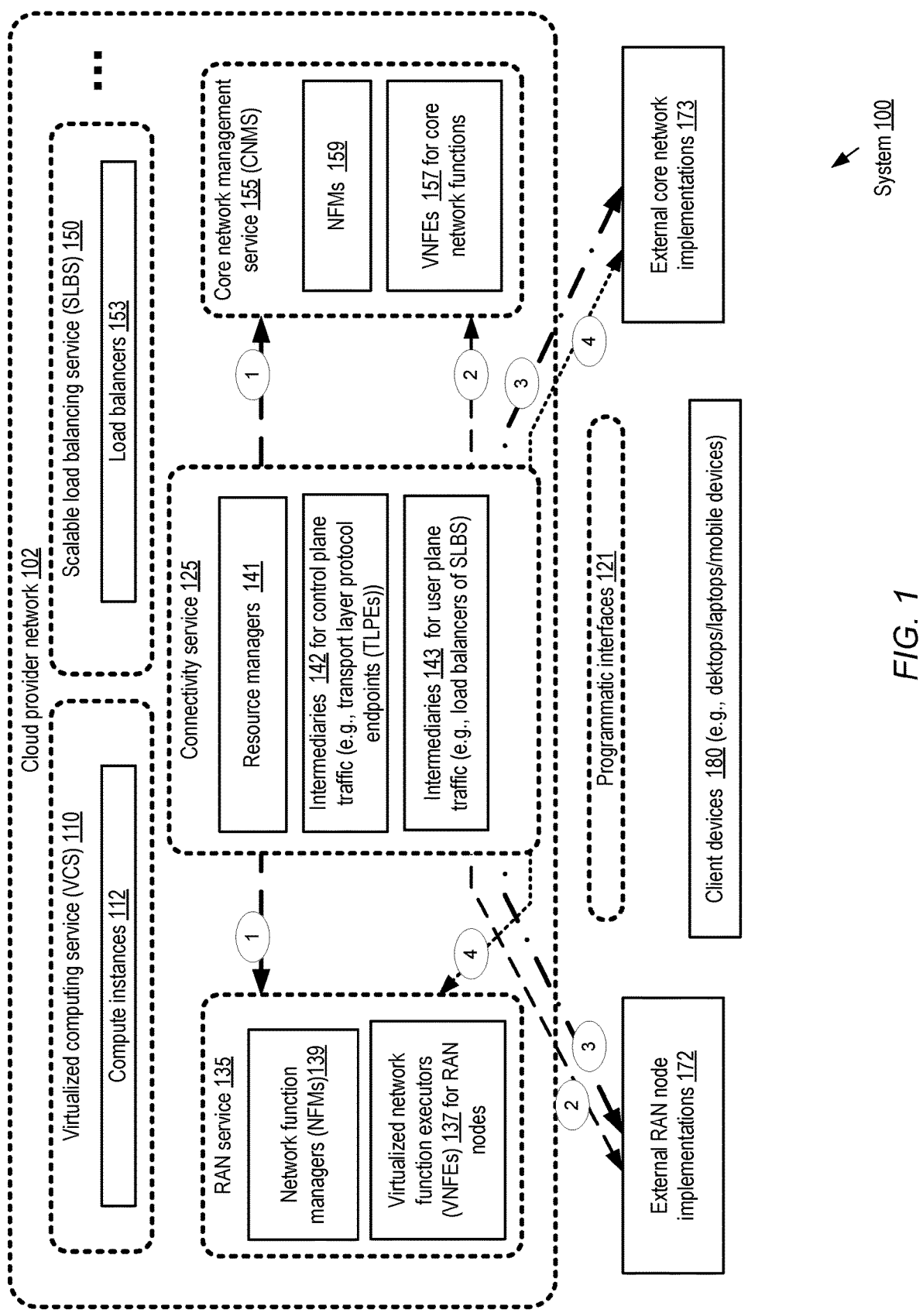
FIG. 1 illustrates an example system environment in which a connectivity service of a cloud provider network may configure intermediaries for network traffic between Radio Access Network (RAN) nodes and core networks of radio-based applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for using resources of a cloud provider network as intermediaries to decouple and load balance communications between network functions of Radio Access Network (RAN) nodes of telecommunication (e.g., fifth-generation or 5G) applications and network functions implemented at the core network layer of the telecommunication applications. The decoupling of the RAN side of the applications from the core network side enables network function execution resources at either side to be scaled independently from each other, enabling the system to adapt gracefully as the workload levels of the applications change at the two sides. Furthermore, the decoupling enables the software and/or hardware being used to implement the network functions of the core network and the RAN nodes to be updated/modified independently of each other, which may not be feasible in some traditional architectures in which RAN nodes and core network components are tightly coupled. In such tightly coupled approaches, for example, an upgrade to a 5G network function used as the access point of the core network for control plane messages (such as 5G's Access and Mobility Management function or AMF) can cause disruptions (such as dropped SCTP (Stream Control Transmission Protocol) connections) at the RAN node.

More specifically, the present disclosure relates to techniques for enabling load balancing for control plane traffic between RAN nodes and core network components of 5G applications. 5G 3GPP (the Third Generation Partnership Project) standards define a micro-services architecture for the 5G core network (5GC), making 5GC a good candidate for implementation in the cloud. However, there are two connections to the 5G RAN that are still defined with fixed endpoints, very limited redundancy capabilities, and without a clear path for load-balancing and scalability to match the micro-services based architecture of the 5GC. These interfaces are N2 and N3. N2 handles all control plane traffic as it is the control plane interface between the RAN and 5GC. The N2 interface supports control plane signaling between the RAN and 5GC covering scenarios related for example to UE context management and PDU session/resource management procedures. N2 uses SCTP (NGAP) between 5GCN and access network. It uses SCTP as the L3 transport mechanism and 3GPP defines NGAP (for example, in 3GPP TS 38.413) as the LA protocol on top of SCTP. N3 handles all user plane traffic; the N3 interface connects the RAN to the user plane function (UPF) and conveys user data from the RAN to the UPF for processing. It uses the User Datagram Protocol (UDP) as the L3 transport mechanism and 3GPP defines GTP-u (for example, in 3GPP TS 29.281) as the L4 protocol on top of UDP. It will be appreciated that L3 and L4 refer to different layers in the OSI model, where L3 is the network layer and L4 is the transport layer.

Thus, the N2 interface defined in the standard for control plane connectivity between 5GC and RAN nodes requires tight coupling between 5GC and RAN components, and is not designed for flexible load balancing or independent scaling of the network functions at the RAN side (centralized unit or CU functions) versus the 5GC side (AMFs for control plane messages). 5G control plane traffic flows over SCTP, which is not supported by typical cloud load balancers. According to the present disclosure, a fleet of SCTP endpoints is set up as load balancing intermediaries for control plane traffic between RAN nodes and 5GC. This enables the AMFs to be set up in active-active mode instead of active-passive mode, and also scaled independently of the RAN network functions, without disrupting existing SCTP connections. Also, by decoupling the RAN side from the 5GC side, updates or configuration changes can be rolled out to AMFs without requiring changes to the RAN nodes. The SCTP endpoints can also be scaled as needed. The decoupling makes it possible to handle a variety of 5G applications (such as 5G voice or data, IoT applications, etc.) which can differ substantially in their patterns of control plane traffic with greater flexibility. The SCTP endpoint fleet can be used regardless of whether the RAN or 5GC network functions are implemented in the cloud.

Further, the N3 interface defined in the standard for user plane connectivity between 5GC and RAN nodes also requires tight coupling between 5GC and RAN components, and is not designed for flexible load balancing or independent scaling of the network functions at the RAN side (centralized unit or CU functions) versus the 5GC side (UPFs for user plane messages). 5G user plane traffic flows over UDP, which is one of the protocols supported by typical cloud load balancers. According to the present disclosure, load balancers managed by a cloud service are configured as intermediaries for user plane traffic between RAN nodes and 5GC. This enables the UPFs to be set up in active-active mode instead of active-passive mode, and to be scaled independently of the RAN network functions, without disrupting existing flows of user plane messages. Also, by decoupling the RAN side from the 5GC side, updates or configuration changes can be rolled out to UPFs without requiring changes to the RAN nodes. The load balancers themselves can be scaled by the service as needed. The decoupling makes it possible to handle a variety of 5G applications (such as 5G voice or data, IoT applications, etc.) which can differ substantially in their patterns of user plane traffic with greater flexibility. The intermediary load balancers can be used regardless of whether the RAN or 5GC network functions are implemented in the cloud.

As described above, in some cases, different networking protocols are used for control plane or administrative traffic of radio-based applications versus user plane messages (which contain representations of the data or voice content being communicated for the users of the application). For example, in 5G standards defined by ETSI (the European Telecommunications Standards Institute) as part of 3GPP, SCTP is used as the transport layer protocol for control plane communications between RAN nodes and the core network, while UDP is used as the transport layer protocol for user plane messages between RAN nodes and the core network. Because of the different protocols, different types of cloud-based network intermediary devices can be used for decoupling of control plane versus user plane communications. For example, for control plane messages, a fleet of SCTP endpoints (such as virtual machines or compute instances configured to perform SCTP processing) can be established and used. In contrast, for user plane messages, a set of logical load balancers implemented at a scalable load balancing service (SLBS) of the provider network, which are already designed and optimized to handle UDP packets, can be used. Other types of intermediary devices or programs can also be used, such as customized transport layer protocol processors that can process both control plane and user plane messages.

The intermediaries for control plane and user plane traffic can be configured at or by a connectivity service implemented as one of a suite of services of the cloud provider network. Virtualized network functions (VNFs) of the core network can also be implemented for various radio-based applications using a provider network service (referred to as a core network management service or CNMS). The term "radio-based application" is used herein to refer to applications in which at least some messages are transmitted using radio frequency signals and associated antennas, such as those used for various generations (4G, 5G and the like) of cellular broadband technologies. In some cases, some or all VNFs of one or more of the RAN components (such as centralized units (CUs), distributed units (DU) and/or radio units (RUS)) can be implemented at a provider network service referred to as a RAN service. The connectivity service can be used to manage RAN-to-core and core-to-RAN messages for different RAN and core implementation choices. For example, in some cases, while the VNFs of the core network and the intermediary devices are both implemented using provider network resources, the RAN node with which the core network VNFs communicate can be implemented using resources that are not managed by the provider network. Conversely, in other cases, while the VNFs of the RAN nodes and the intermediary devices are both implemented using provider network resources, the VNFs of the core network layer with which the RAN nodes communicate can be implemented using resources that are not managed by the provider network. The connectivity service can also be used to decouple communications between RAN nodes that use resources external to the provider network, and core network components that also use resources external to the provider network. A variety of configuration choices with regard to fanout (e.g., how many RAN nodes utilize a given intermediary for control plane or user plane communications, how many core network virtual function execution resources are sent control plane or user plane messages from a given intermediary, and so on) and tenancy (e.g., whether a given control plane message intermediary device is assigned to a single application or to multiple applications, whether a given VNF execution resource at the core network is assigned to a single application or to multiple applications, and so on) can be supported flexibly in the proposed approach.

A network function is a functional building block within a network infrastructure, which has well-defined external interfaces and a well-defined functional behavior. Network functions can be chained together to form pipelines for executing telecommunications services or applications, such as public or private 5G data or voice applications, IoT (Internet of Things) applications, and the like. Network functions have historically been implemented as a physical network appliance or node; however, network functions can be virtualized as well. The resources (such as compute instances or virtual machines of a virtualized computing service or VCS) that are used to implement virtualized network functions can be referred to as VNF executors (VNFEs). A given VNFE can implement or execute instances of one or more VNFs, such as one or more AMFs, one or more UPFs, or one or more VNFs of one or more RAN nodes.

As one skilled in the art will appreciate in light of this disclosure, certain embodiments may be capable of achieving various advantages, including some or all of the following: (a) providing desired levels of performance (such as application request response times within target limits) for telecommunications applications and other latency sensitive applications using a smaller set of resources than may have been required for supporting similar workload levels using traditional approaches in which some network functions are configured in active/standby mode, (b) reducing the amount of application disruptions that may result from maintenance events such as upgrades or updates to software or hardware being used for network functions of the telecommunication applications, and/or (c) simplifying administration of the network function pipelines used for the telecommunication applications, for example by reducing the set of applications that can be impacted by a failure at a particular network function executor. The flexibility provided by the proposed techniques for decoupled communications between RAN nodes and core networks may enable a wide variety of application types, with differing ratios of control plane traffic to user plane traffic, to be supported easily without requiring substantial reconfiguration of either the RAN nodes or the core network functions. For example, combinations of enhanced mobile broadband (eMBB) applications, massive machine-type communications (mMTC) applications, as well as ultra-reliable and Low Latency Communications (URLLC) applications may all be supported without difficulty using the proposed approach.

According to some embodiments, a system may include one or more resource managers (RMs) of a connectivity service for managing traffic of radio-based applications, a collection of transport layer protocol endpoints (TLPEs) of the connectivity service, and one or more core network function managers (CNFMs) of a radio-based application management service of a cloud provider network. An RM may assign, for example in response to a programmatic request from a client of the connectivity service, a TLPE as an intermediary for control plane messages transmitted between (a) a first radio access network (RAN) node of a radio-based application (RBA) and (b) a set of core network control plane access endpoints (CCPAEs) of the first radio-based application. A core network control plane access endpoint executes a virtualized network function to which control plane messages are typically sent from a RAN node; that access endpoint may in turn relay some of the control plane messages to other devices at which other core network VNFs are run, or generate new control plane messages to be sent to the other VNFs based on processing the control plane messages received from the RAN node. In a 5G architecture standard proposed by the ETSI, for example, a CCPAE may run AMF (Access and Mobility Management) network functions, while in a 4G architecture, Mobility Management Entities (MMEs) network functions may be executed at the core network access endpoint. In some embodiments the RM may receive a connectivity establishment request from a client, indicating one or more RAN nodes of an RBA and one or more CCPAEs of the application, and assign the TLPE in response to such a request.

The TLPE assigned by the RM may transmit control plane messages of the RBA in both directions in at least some embodiments. Control plane messages generated by or received from a RAN node may be transmitted by the TLPE to a CCPAE, and control plane messages generated by or received from the CCPAE may be transmitted by the TLPE to the RAN node. A core network function manager (CNFM) may be responsible for making configuration changes as needed with respect to the core network VNFs in various embodiments. For example, in response to detect that a triggering condition (e.g., based on measured resource utilizations of the CCPAEs) for scaling up the set of CCPAEs has been satisfied, the CNFM may increase the number of CCPAEs to which messages from a given RAN node or a set of RAN nodes are delivered. In other examples of configuration changes initiated by the CNFM, the number of CCPAEs may be decreased, or more powerful computing resources may be allocated for executing a core network VNF of a CCPAE, and so on. Such configuration changes may be implemented on the core network side without causing a change to a configuration of the RAN node, and without causing an interruption in existing flows of control plane messages sent from the RAN node to a CCPAE via the TLPE in at least some embodiments.

Depending on the radio-based technology stack being implemented, different kinds of RAN nodes may be used in various embodiments. Examples of RAN nodes include gNodeBs (in the case of 5G technology stacks), eNodeBs (in the case of 4G/LTE (Long Term Evolution) technology stacks), and so on. Similarly, the specific transport layer protocol and/or application layer protocol used for control plane communications may differ from one embodiment to another. In at least some embodiments in which 5G technology is being used, for example, SCTP (the Stream Control Transmission Protocol) may be used as the transport layer protocol, and control plane application layer messages sent over SCTP connections may use NGAP (the Next Generation Application Protocol). In such embodiments, the TLPEs may participate in the establishment and management of SCTP connections between the RAN node and the core network. In one embodiment, for example, an SCTP connection may be established by a TLPE between a RAN node component (such as a centralized unit or CU of a gNodeB) of an RBA and a CCPAE. In one implementation, a pair of underlying SCTP connections may be established for a logical SCTP link between the RAN node and the core network-one underlying SCTP connection between a RAN node and the TLPE, and another underlying SCTP connection between the TLPE and a core network VNF.

The number of RAN nodes whose control plane traffic is handled by a given TLPE, and/or the number of CCPAEs to which control plane messaged from one or more RAN nodes are transmitted by a given TLPE, may vary in different embodiments. In some embodiments, for example, multiple RAN nodes (of a single radio-based application or multiple radio-based applications) may send their control plane messages to a TLPE configured in multi-tenant mode. In one embodiment, a CCPAE may be configured in multi-tenant mode, and may process control plane messages sent (via one or more TLPEs) from multiple RAN nodes. In other embodiments, at least some TLPEs and/or CCPAEs may be configured in single-tenant mode. A single-tenant TLPE may process and forward control plane messages of a single radio-based application, or of a single RAN node. A single-tenant CCPAE may process control plane messages of a single radio-based application, or of a single RAN node. A given radio-based application may include multiple RAN nodes in some embodiments. TLPEs, CCPAEs and/or at least a subset of virtual network functions of RAN nodes may be implemented using cloud provider network resources (e.g., compute instances running on virtualization hosts of a virtualized computing service) in various embodiments. In some embodiments, some VNFs of a RAN node of a radio-based application (e.g., VNFs of a centralized unit (CU), distributed unit (DU) or radio unit (RU) of a gNodeB) may be run at cloud-based servers equipped with network function accelerator cards which can offload some of the RAN VNF computations from the primary processors (such as CPUs) of the servers. In one embodiment, a subset of VNFs of the core network and/or TLPEs used for a radio-based application may also or instead be run at such accelerator-equipped servers.

According to some embodiments, in addition to or instead of utilizing intermediaries of a connectivity service for control plane traffic as described above, user plane traffic of a set of radio-based applications may be transmitted between RAN nodes and core network VNFs via intermediary devices such as load balancers of a cloud-based service. In some such embodiments, a system may comprise one or more resource managers (RMs) of a connectivity service implemented at a cloud provider network for traffic of radio-based applications, one or more load balancers (LBs) implemented at a scalable load balancing service (SLBS) of the cloud provider network, and one or more core network function managers (CNFMs) of a radio-based application management service. In some embodiments in which both control plane and user plane traffic is managed using cloud-based intermediary devices, a single connectivity service may be used for both types of traffic; in other embodiments, separate connectivity services may be used for control plane versus data plane traffic. An RM may be configured to cause to be assigned, in response to a programmatic request from a client of the connectivity service, a particular LB of the SLBS as an intermediary for user plane messages transmitted between (a) a RAN node of a radio-based application and (b) a set of core network user plane access endpoints (CUPAEs) of the radio-based application. A CUPAE may execute a virtualized network function to which user plane messages are typically sent from a RAN node; that access endpoint may in turn relay at least some of the user plane messages to a destination via public networks (such as the public Internet) or private networks. In a 5G architecture standard proposed by the ETSI, for example, a CUPAE may run UPF (User Plane Function) network functions, while in a 4G architecture, Serving Gateway (SGW) and/or Packet Data Network Gateway (PGW) network functions may be executed at the core network user plane access endpoint. In some embodiments the RM may receive a connectivity establishment request from a client, indicating one or more RAN nodes of an RBA and one or more CUPAEs of the application, and assign an intermediary such as an LB in response to such a request.

Within the set of CUPAEs, at least a subset of core network user plane access endpoints may be configured in an active-active mode in various embodiments, such that processing of a particular user plane message at a first CUPAE of the subset overlaps at least partly in time with processing of another user plane message at a second CUPAE. In some cases, a pair of CUPAEs may be configured in active-active mode; in other cases, N CUPAEs, where N>2, may be configured in active-active mode. State information of various message flows being processed by a given pair or group of CUPAEs may be replicated among the CUPAEs of the pair or group in at least some embodiments. In contrast to the active-active mode, some traditional implementations of core network VNFs employ active-passive mode pairs for core network VNFs such as 5G UPFs (User Plane Functions), in which only a currently-active VNF of the pair processes user plane messages, while the other VNF of pair waits to potentially fail over the currently-active VNF's workload in the event of a failure at the currently-active VNF. Messages formatted in accordance with dynamic routing protocols such as a variant of the Border Gateway Protocol (BGP) may be used to provide an indication to message senders or network routers as to which VNF is currently the active VNF of the active-passive pair in such traditional implementations. The need for configuring passive VNFs may be eliminated in environments in which intermediaries such as LBs can direct incoming traffic to any available VNF; as a result, in various embodiments in which such intermediaries are used, a much higher proportion of the computing and other resources assigned for the CUPAEs can be utilized on average. Note that in some embodiments in which control plane traffic is decoupled using transport layer protocol endpoints of the kind described above, pairs or groups of core network control plane access endpoints (CCPAEs) may also be configured in active-active mode instead of in active-passive mode, with similar state information replication, and similar benefits regarding utilization and other metrics.

An LB or similar intermediary may transmit user plane messages from one or more RAN nodes to one or more CUPAEs, and user plane messages received from the one or more CUPAEs to one or more RAN nodes in various embodiments. In some cases, in the active-active mode of operation, a user plane message UPM1 in the RAN-to-core direction (based for example on an end user request) may be transmitted to a first CUPAE of an active-active group of CUPAEs, while the response user plane message UPM2 (containing data requested in UPM1, for example) may be processed at a different CUPAE of the active-active group. A core network function manager may detect (e.g., using various metrics collected from the CUPAEs) that a triggering condition for scaling up or otherwise re-configuring the set of CUPAEs has been satisfied. Based at least in part on detecting the condition, the CNFM may take any of various actions, such as adding CUPAEs, removing or decommissioning CUPAEs, etc., without requiring or causing changes to RAN node configuration, and without causing an interruption in existing flows of user plane messages sent from the RAN node(s) to one or more CUPAEs in various embodiments.

As in the scenarios described above in which control plane communications are decoupled, different kinds of RAN nodes may be used in various embodiments in which user plane communications are decoupled using LBs or other intermediaries. Examples of RAN nodes include gNodeBs (in the case of 5G technology stacks), eNodeBs (in the case of 4G/LTE (Long Term Evolution) technology stacks), and so on. Similarly, the specific transport layer protocol and/or application layer protocol being used for user plane communications may differ from one embodiment to another. In at least some embodiments in which 5G technology is being used, for example, UDP (the User Datagram Protocol) may be used as the transport layer protocol, and control plane application layer messages sent over UDP messages may use GTP-u (the GPRS (General Packet Radio Service) tunneling protocol for user data).

The number of RAN nodes whose user plane traffic is handled by a given intermediary such as an LB, and/or the number of CUPAEs to which user plane messaged from one or more RAN nodes are transmitted via a given intermediary, may vary in different embodiments. In some embodiments, for example, multiple RAN nodes (of a single radio-based application or multiple radio-based applications) may send their user plane messages to an intermediary configured in multi-tenant mode. In one embodiment, a CUPAE may be configured in multi-tenant mode, and may process user plane messages sent (via one or more intermediaries) from multiple RAN nodes. In other embodiments, at least some intermediaries and/or CUPAEs may be configured in single-tenant mode. A single-tenant user plane intermediary may process and forward messages of a single radio-based application, or of a single RAN node. A single-tenant CUPAE may process user plane messages of a single radio-based application, or of a single RAN node. User plane intermediaries, CUPAEs and/or at least a subset of virtual network functions of RAN nodes may be implemented using cloud provider network resources (e.g., compute instances running on virtualization hosts of a virtualized computing service) in various embodiments.

In various embodiments in which load balancers of a cloud-based service are used as intermediaries for user plane traffic, the scalability of the load balancers themselves may be managed by the cloud-based service. For example, a given logical load balancer of a scalable load balancing service may actually comprise a collection or mesh of compute nodes sharing a common IP address (the logical load balancer's IP address, to which messages that are to be load balanced are sent), and the service may automatically add more compute nodes to implement the load balancing algorithm being used if required.

In at least some embodiments, as indicated above, connectivity services and/or radio-based application management services (such as core network management services or RAN services) may be implemented as part of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. However, as described herein, customers may also access the cloud provider network by way of RANs provided at edge locations such as a customer's premises. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, software containers or other software units implementing VNFs of a radio-based application may be launched within a region of a virtualized computing service (VCS), at an edge location of the VCS, or at a VCS extension location. For example, RAN NFs may be launched at an edge location of the VCS close (or closest) to the UE connecting to the RAN. Depending upon the customer's desired network configuration and/or latency requirements, the NFs of the 5GC may be launched at an edge location (for example the same edge location as the RAN or a nearby edge location such as a local zone, defined below) or in a cloud datacenter of an availability zone. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Some edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to connectivity services and/or radio-based application management services, data processing service(s) (e.g., map reduce, data flow, and/or other large scale data processing techniques), data storage services (e.g., object storage services, block-based storage services, or data warehouse storage services), packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service or VCS (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

In a manner similar to the way that traffic associated with radio-based applications is divided into control plane and user plane messages, the traffic and operations of the cloud provider network (or individual services of the cloud provider network) may also broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a connectivity service of a cloud provider network may configure intermediaries for network traffic between Radio Access Network (RAN) nodes and core networks of radio-based applications, according to at least some embodiments. As shown, system 100 comprises resources and artifacts of a connectivity service 125, a RAN service 135, a core network management service (CNMS) 155, a virtualized computing service (VCS) and a scalable load balancing service (SLBS) 150 of a cloud provider network 102. The cloud provider network may include additional services not shown in FIG. 1, such as a software container management service (CMS), database management service, and so on. The RAN service 135 and CNMS 155 are examples of radio-based application management services (RBAMSs) which may be implemented at a provider network. In the embodiment shown in FIG. 1, virtualized network functions (VNFs) implementing RAN nodes (such as gNodeBs or eNodeBs) of various radio-based applications may be run at VNF executors (VNFEs) 137 (e.g., virtual machines or physical servers) and managed by network function managers (NFMs) 139 of the RAN service. Similarly. VNFs implementing operations of the core network for various radio-based applications may be run at VNFEs 157 and managed by NFMs 159 of the CNMS 155.

Resource managers 141 of the connectivity service 125 may be responsible for establishing or configuring intermediaries for control plane and user plane traffic between RAN nodes implemented using VNFEs of the RAN service and core network functions implemented at the VNFEs of the CNMS in the depicted embodiment. Intermediaries 142 may be set up for control plane traffic, while intermediaries 143 may be set up for user plane traffic in the depicted embodiment. In some embodiments, a common set of intermediaries may be used for both user plane and control plane traffic. Examples of intermediaries 142 may include SCTP endpoints or other transport layer protocol endpoints, while examples of intermediaries 143 may include load balancers 153 of SLBS 150 in some embodiments. In general, any of a variety of devices may be used as intermediaries for control plane or user plane messages. The VCS 110 may implement compute instances 112, such as virtual machines, which can be utilized to run various types of software programs, including for example VNFs run within software containers, intermediaries 142 or 143, resource managers 141, NFMs 139, NFMs 159, and so on in some embodiments. Various components of the services of cloud provider network 102 may be implemented using some combination of software and hardware at one or more computing devices. Some services of the provider network may use other services—for example, as mentioned above, components of connectivity service 125, RAN service 135, the CNMS 155 and/or the SLBS 150 may run using compute instances 112 of the VCS 110.

At least some of the services implemented at provider network 102 may implement respective sets of programmatic interfaces 121, which can be used by clients of the services to submit various types of requests from client devices 180 (e.g., desktops, laptops or mobile computing devices) and receive corresponding responses. For example, clients of the connectivity service 125 may use programmatic interfaces 121 to specify the specific RAN nodes (e.g., gNodeBs or eNodeBs) and core network VNFs (e.g., AMFs or UPFs) between which decoupled connectivity via intermediaries is to be established, and specify policies if desired pertaining to the tenancy mode (single-tenant vs. multitenant) in which intermediaries 142 and/or 141 are to be configured. Similarly, clients of the CNMS and/or the RAN service may also submit requests to those services via programmatic interfaces, pertaining to the initial configuration and/or subsequent configuration changes of the corresponding components of the clients' radio-based applications.

In response to programmatic requests received from clients, resource managers 141 may assign one or more intermediaries 142 for control plane traffic between a RAN node (whose VNFs may be implemented at VNFEs 137) and a core network control plane access endpoint or CCPAE (whose VNFs may be implemented at VNFEs 157) in the depicted embodiment. Similarly, resource managers 141 may assign one or more intermediaries 143 for user plane traffic between a RAN node and a core network user plane access endpoint or CUPAE (whose VNFs may also be implemented at VNFEs 157) in the depicted embodiment. The assigned intermediaries may transmit messages in both directions between the RAN nodes and the core network. NFMs at the CNMS may monitor various metrics pertaining to the VNFEs 157 and/or the intermediaries 142 and 143, and cause changes to the configuration of the VNFEs 157 and/or the intermediaries without requiring or causing changes at the RAN service in at least some embodiments. For example, more CCPAEs or CUPAEs may be added to a set of network functions being used for a given radio-based application's set of RAN nodes, some CCPAEs or CUPAEs may be decommissioned or removed, and so on. Similarly, NFMs at the RAN service may monitor various metrics pertaining to the VNFEs 137 and/or the intermediaries 142 and 143, and cause changes to the configuration of the VNFEs 137 and/or the intermediaries without requiring or causing changes at the CNMS in at least some embodiments. In addition, resource managers 141 may monitor various metrics pertaining to the intermediaries 142 and 143, and modify the intermediary configuration for a given set of RAN nodes and core network VNFs automatically, without requiring substantial changes at the RAN service or the CNMS in at least some embodiments. Note that depending on the specific type of configuration change being implemented, minor configuration changes may be needed at the RAN service or CNMS—for example, a new IP address to be used for an additional intermediary 142 or 143 that can be used for future message flows may be stored at the RAN service and/or the CNMS. In various embodiments, existing or in-progress message flows may not be interrupted or disrupted as a result of at least some configuration changes implemented automatically by NFMs or resource managers. In some embodiments, configuration changes (e.g., at VNFEs 157, intermediaries 142 or 143, and/or VNFEs 137) may be triggered by indications or notifications of planned maintenance events (such as software updates), and not just in response to analysis of metrics. In at least some embodiments, failures detected at the VNFEs or intermediaries may trigger configuration changes.

The connectivity service 125 may provide intermediaries not just for radio-based applications whose core network VNFs and RAN nodes are implemented using provider network resources (e.g., VNFEs 157 or 137), but also for radio-based applications with components implemented using resource external to the provider network (e.g., at resources at client-owned data centers or third-party data centers) in the depicted embodiment. Connectivity between four different combinations of (RAN node implementations, core network implementations) may be supported via connectivity service 125, as indicated by the bidirectional arrows labeled 1, 2, 3 and 4. Arrow 1 indicates connectivity provided by connectivity service 125 between RAN nodes implemented at RAN service 135 and core network VNFs implemented at CNMS 155. Arrow 2 indicates connectivity provided by connectivity service 125 between external RAN node implementations 172 and core network VNFs implemented at CNMS 155. Arrow 3 indicates connectivity provided by connectivity service 125 between RAN nodes implemented at RAN service 135 and external core network implementations 173, while arrow 4 indicates connectivity provided by connectivity service 125 between external RAN node implementations 172 and external core network implementations 173. When requesting connectivity to be provided between a RAN node and a core network, a client of the connectivity service may provide information identifying the kind of resources (e.g., provider network resources or external resources) being used for the RAN node and the core network in various embodiments, such as the IP addresses that can be used to communicate with the network functions at either side of the communication (the RAN side and the core network side). In some cases, one or more of the network functions of external RAN node implementations 172 and/or external core network implementations may not necessarily be virtualized—e.g., custom or special-purpose hardware devices may be used for such network functions. In some embodiments, the same kinds of intermediaries 142 and 143 may be used by resource managers regardless of which type of connectivity (e.g., from among the four types of connectivity illustrated using arrows 1, 2, 3 and 4) is desired by a client. In other embodiments, separate sets of intermediaries may be configured for the respective types of connectivity. In some embodiments, a connectivity service similar in features and functionality to connectivity service 125 may be implemented as a component of a core network management service (CNMS) (similar to CNMS 155) or as a component of a RAN service (similar to RAN service 135).

Figure 2:
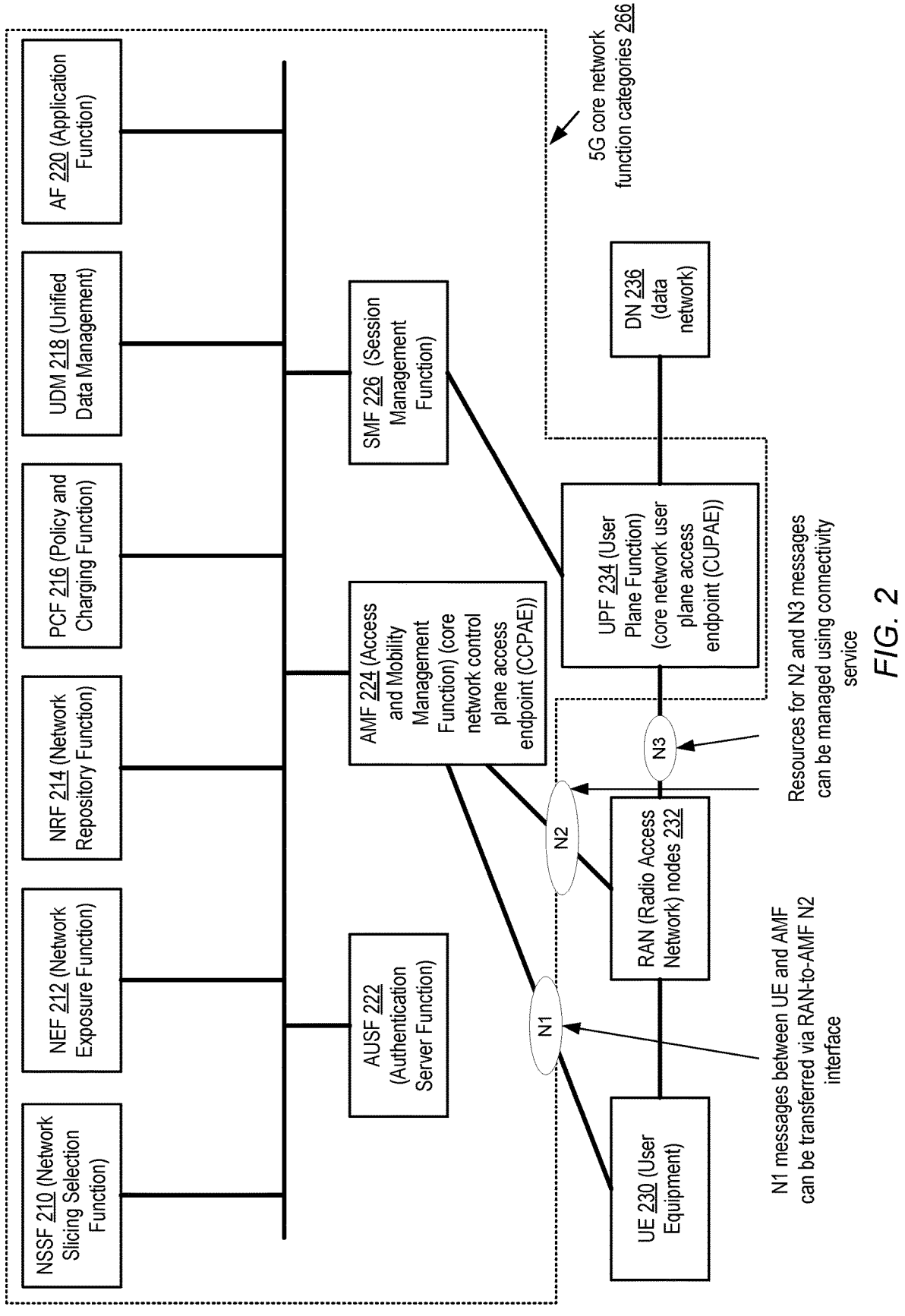
FIG. 2 illustrates example categories of network functions implemented as part of a core network of a radio-based technology stack, according to at least some embodiments.

FIG. 2 illustrates example categories of network functions implemented as part of a core network of a radio-based technology stack, according to at least some embodiments. The components shown in FIG. 2 correspond to a reference architecture for a version of a 3GPP (Third Generation Partnership Project) 5G system released by ETSI. Note that the decoupling techniques introduced in this document may be used with other architectures and other combinations of network functions, and is not restricted to the particular architecture shown in FIG. 2.

5G core network function categories 266 in the depicted embodiment may include AMF 224 (Access and Mobility Management), UPF 234 (User Plane Function), NSSF 210 (Network Slicing Selection Function), NEF 212 (Network Exposure Function), NRF 214 (Network Repository Function), PCF 216 (Policy and Charging Function), UDM (Unified Data Management) 218, AF (Application Function) 220, AUSF 222 (Authentication Server Function) and SMF 226 (Session Management Function). The details of the kinds of operations expected to be performed by the network functions of the different network function categories, and the interfaces to be used for communications between the different categories of core network functions, are provided in 5G-related standards documents. With respect to the communications between RAN nodes 232 and the core network functions, two interfaces are defined in the standard: an interface referred to as N2 for control plane messages, and an interface referred to as N3 for user plane messages.

Control plane messages from a RAN node 232 that are to be sent to the core network may be sent via the N2 interface to an AMF 224 in the depicted embodiment. Depending on the kind of control plane message, the AMF may then initiate various operations, which in some cases may involve intra-core-network messages between the AMF and other core network functions. The AMF may also send control plane message responses to the RAN node via the N2 interface. An AMF thus serves as a core network control plane access endpoint (CCPAE) in at least some embodiments. In at least some implementations, control plane messages from user equipment (UE) 230 (such as cell phones, Internet-of-Things devices, etc.), which can be transmitted to AMFs directly via an interface referred to as N1, may instead be sent to RAN nodes and from the RAN nodes to the AMFs using the N2 interface.

User plane messages from a RAN node 232 that are to be sent to the core network may be sent via the N3 interface to a UPF 234 in the depicted embodiment. At least in some cases, the contents of the user plane messages may originate at user equipment (UE) 230, and may have to be sent to some destination via a data network (DN) 236. The DN may for example comprise portions of a public network (such as the public Internet) and/or one or more private networks. The UPF may coordinate the transfer of the user plane message contents via the DN 236; responses to the user plane messages may be received by a UPF from the destinations and passed on to the UEs 230 via the RAN node. A UPF thus serves as a core network user plane access endpoint (CUPAE) in at least some embodiments.

In some embodiments in which the techniques introduced herein are used for 5G applications, the N2 interface for control plane messages between RAN nodes and AMFs may in effect be implemented with the help of control plane traffic intermediaries such as SCTP endpoints set up by a connectivity service similar to connectivity service 125 of FIG. 1. Similarly, in such embodiments, the N3 interface for user plane messages between RAN nodes and UPFs may in effect be implemented with the help of user plane traffic intermediaries such as load balancers set up with the help of the connectivity service. In embodiments in which the 5G architecture is not being used for an application, the CCPAEs may not necessarily be AMFs (for example, CCPAEs may be MMEs if 4G is being used) and the CUPAEs may not necessarily be UPFs (for example, CUPAEs may comprise SGWs or PGWs in the 4G case).

Figure 3:
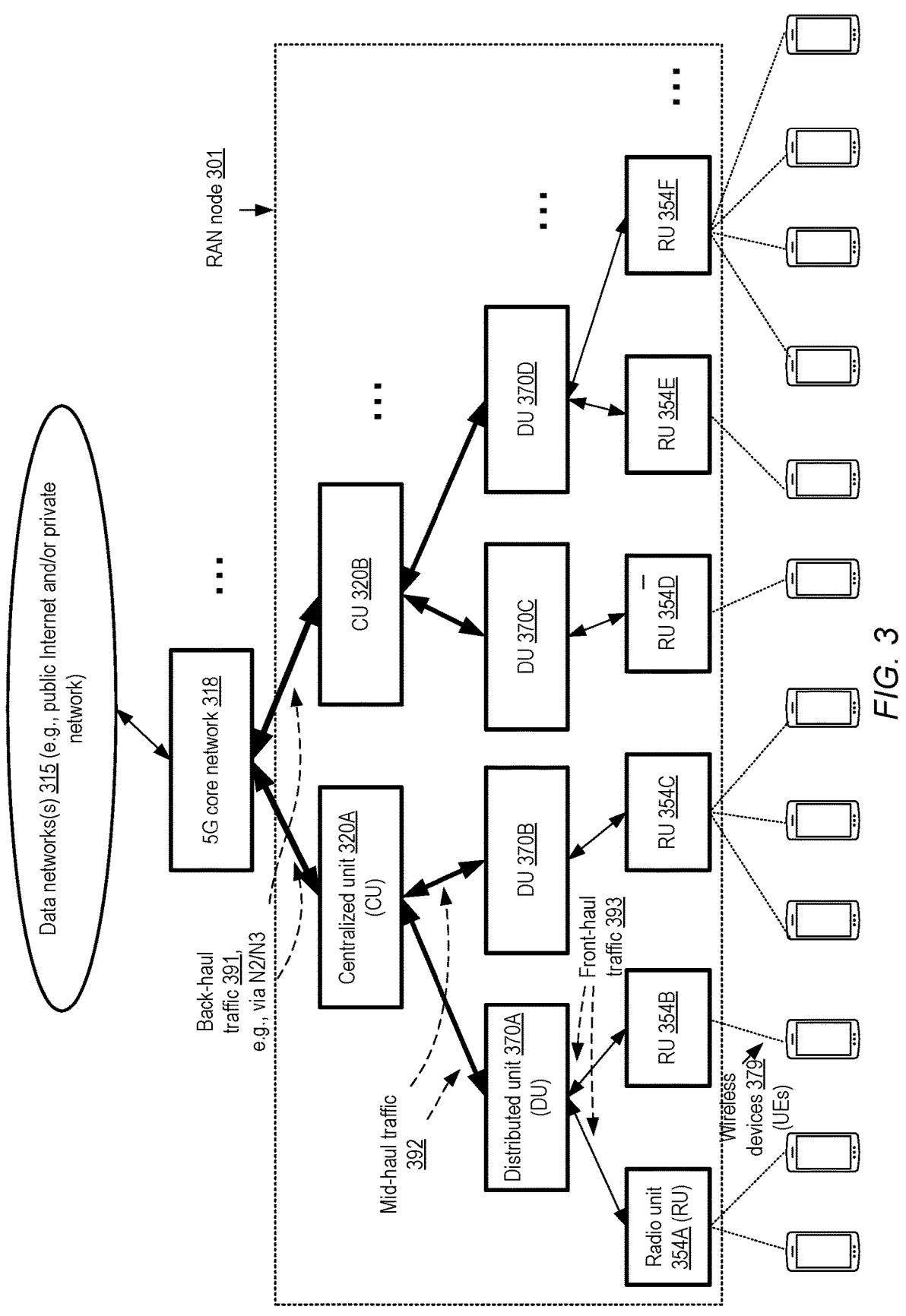
FIG. 3 illustrates example layers of a RAN node, according to at least some embodiments.

FIG. 3 illustrates example layers of a 5G RAN node, according to at least some embodiments. A RAN node, also referred to as a base station, may act as an intermediary between user equipment such as mobile phones (which may emit messages via radio signals) of a radio application and the core network, which expects messages formatted according to protocols such as IP. The names of RAN nodes may differ depending on the generation of technology being used—e.g., for 5G, a RAN node may be referred to as a gNodeB, while for 4G, a RAN node may be referred to as eNodeB.

The 5G-NR (New Radio) protocol stack used for 5G RAN nodes comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: centralized units (CUs) for L3 operations, distributed units (DUs) used for L2 operations and optionally for some L1 operations, and radio units (RUs) used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). With 5G RAN nodes, user plane operations may include quality of service (QoS) Management and Compression Integrity Ciphering in L3, Automatic Repeat Request (ARQ) processing and Hybrid ARQ (HARQ) processing in L2, and Channel Coding at the PHY layer. Control plane operations at a 5G RAN node may include Non-access Stratum (NAS) protocol tasks, System Information (SI) tasks, Paging, Radio Resource Control (RRC) and Compression Integrity Ciphering in L3, ARQ and HARQ in L2, and Channel Coding in the PHY layer. At least some of the layers and protocols of a RAN node may comprise the execution of respective sets of network functions. In at least some embodiments, a subset of the network functions of RAN nodes may be implemented using provider network resources, e.g., including compute instances of a VCS. Standards organizations have defined several options for splitting the functions of the pipelines among the CUS (Centralized Units) and DUs (Distributed Units). Such splits make it possible to distribute the workload for radio-based applications across several different devices, instead of relying on monolithic devices responsible for performing all the functions.

In the embodiment depicted in FIG. 3, virtual network function executors (VNFEs) implementing network functions of the 5G core network 318 may be linked to one or more data networks 315, and also to centralized units (CUs) of one or more RAN nodes 301. A given RAN node 301 may comprise one or more centralized units (CUs) 320, one or more distributed units (DUs) 370 and one or more radio units (RUs) 354 arranged in a hierarchy in some embodiments. A given CU may be linked to one or more DUs—e.g., CU 320A is linked to DUs 370A and 370B, while CU 320B is linked to DUs 370C and 370D. A given DU may in turn be linked to one or more RUs—for example, DU 370A is linked to RU 354A and RU 354B. DU 370B is linked to RU 354C, DU 370C is linked to RU 354D, and DU 370D is linked to RU 354E and RU 354F. A given RU may handle radio signals to/from numerous wireless devices 379 (examples of user equipment or UEs of radio-based applications). The traffic between the core network 318 and the CUS 320 (which may use the N2 or N3 interfaces of FIG. 2, and for which connectivity may be provided using intermediaries set up by a connectivity service similar to connectivity service 125 in some embodiments) may be referred to as back-haul traffic 391. Traffic between CUs and DUs may be referred to as mid-haul traffic 392, and traffic between DUs and RUs may be referred to as front-haul traffic 393.

FIG. 4 illustrates an example of a decoupled RAN-to-core control plane messaging architecture, according to at least some embodiments. In a traditional implementation 400, one or more network connections linking a RAN node 402 directly (without intermediaries) to a CCPAE 405 may be set up for control plane traffic. As a result, if and when such a connection is terminated, e.g., in order to upgrade the software being used for the CCPAE, user plane operations at both sides (the RAN node and the core network) may be affected. Furthermore, if more computing power is needed for CCPAE network functions, and an additional CCPAE is accordingly configured, an additional RAN node (or additional components such as CUs of the RAN node) may also have to be configured, since each CCPAE is expecting to communicate with a respective RAN node. Such additional RAN node components may have to be set up even if the amount of computation required on the RAN node side can be handled perfectly well by the existing RAN node components. In some traditional implementations, pairs of CCPAEs such as AMFs may be run in active-passive mode, with one CCPAE remaining active while the other remains largely idle, waiting to take over the functionality of the active CCPAE in the event of a failure. Such active-passive configuration results in lower overall resource utilization than if a passive CCPAE did not have to be configured.

These types of problems may be avoided in some embodiments using a decoupled RAN-to-core control plane architecture 450 implemented with the help of a connectivity service similar in functionality to connectivity service 125 of FIG. 1. In such an embodiment, a control plane traffic intermediary set 415 may be established by the connectivity service for one or more radio-based applications. The intermediary set may, for example, include one or more transport layer protocol endpoints or TLPEs, such as TLPE 422A or TLPE 422D. Collectively, the intermediary set 415 may enable messages to be transferred in either direction between a set of RAN nodes 412 (such as RAN nodes 412A and 412K) of the application(s) and a set of CCPAEs 435, such as CCPAEs 435A and 435P. The decoupling approach may allow the RAN node layer and the CCPAEs to be scaled up or down (or more generally, reconfigured) entirely or largely independently of each other. In at least some embodiments, the intermediary set may be reconfigured or scaled without affecting existing control plane packet flows. In at least some embodiments, all the CCPAEs of a group of CCPAEs set up for a given set of radio-based applications may run in active-active mode, with state information for various control plane message flows being replicated at all the CCPAEs of the group, and all the CCPAEs active concurrently (e.g., processing messages of respective flows during overlapping time intervals) instead of waiting in passive mode.

FIG. 5 and FIG. 6 illustrate examples of configuration options for RAN nodes, control plane traffic intermediaries, and core network control plane access endpoints, according to at least some embodiments. In configuration option 550A of FIG. 5, a given transport layer protocol endpoint (TLPE) may be configured for control plane communications between a given RAN node and a given CCPAE. Thus, for example, TLPE 522A of control plane traffic intermediary set 515 is used for control plane messages flowing between RAN node 512A of an application App1, and App1 CCPAE 532A. TLPE 522B may be used for control plane messages flowing between RAN node 512B of a different application App2, and App2 CCPAE 532B. This option may be referred to as a 1:1:1 configuration, in which 1 RAN node is coupled to 1 CCPAE using 1 TLPE.

In configuration option 550B of FIG. 5, N RAN nodes of a given client of the connectivity service may be linked to a single CCPAE. For example, as shown, TLPE 562 of control plane traffic intermediary set 555 may provide bidirectional connectivity between App1 RAN node 552A and App1 CCPAE 542, and the same TLPE 562 may also provide bidirectional connectivity between App1 RAN node 552B and App1 CCPAE 542. Option 550B may be referred to as an N: 1:1 configuration.

In configuration option 550C of FIG. 5, a single RAN node of a given client of the connectivity service may be linked to multiple CCPAEs configured in active-active mode via a given TLPE acting as the logical equivalent of a load balancer. For example, as shown, TLPE 574 of control plane traffic intermediary set 585 may provide bidirectional connectivity between App1 RAN node 572 and App1 CCPAEs 577A, 577B and 577C. Option 550B may be referred to as a 1:1:N configuration.

Configuration option 650A of FIG. 6 shows a multi-tenant TLPE being used to connect RAN nodes of different clients or different radio-based applications to respective CCPAEs. Control plane traffic intermediary set 615 includes multi-tenant TLPE 622, which transmits control plane messages between RAN node 612A of an application App1 and CCPAE 632A of App1. Multi-tenant TLPE 622 also conveys messages between RAN node 612B of a different application (App2), and App2 CCPAE 632B.

In configuration option 650B, a multi-tenant intermediary may be combined with a multi-tenant CCPAE. Control plane traffic intermediary set 655 comprises a TLPE 662, which transfers control plane messages between RAN nodes of several different applications or clients (such as App1 RAN node 652A and App2 RAN node 652B) to a shared CCPAE 642. Configuration option 650B differs from configuration option 550B of FIG. 5 in that the multiple RAN nodes 552 of option 550B are used for the same application (App1), while the RAN nodes 652A and 652B are used for different applications (which may in some cases be run in behalf of different clients of the connectivity service, or different clients of the provider network at which the connectivity service is implemented). Other configuration options than those shown in FIG. 5 and FIG. 6, or blends/combinations of the configuration options shown in FIG. 5 or FIG. 6, may be used in some embodiments for decoupling control plane traffic of radio-based applications.

Figure 7:
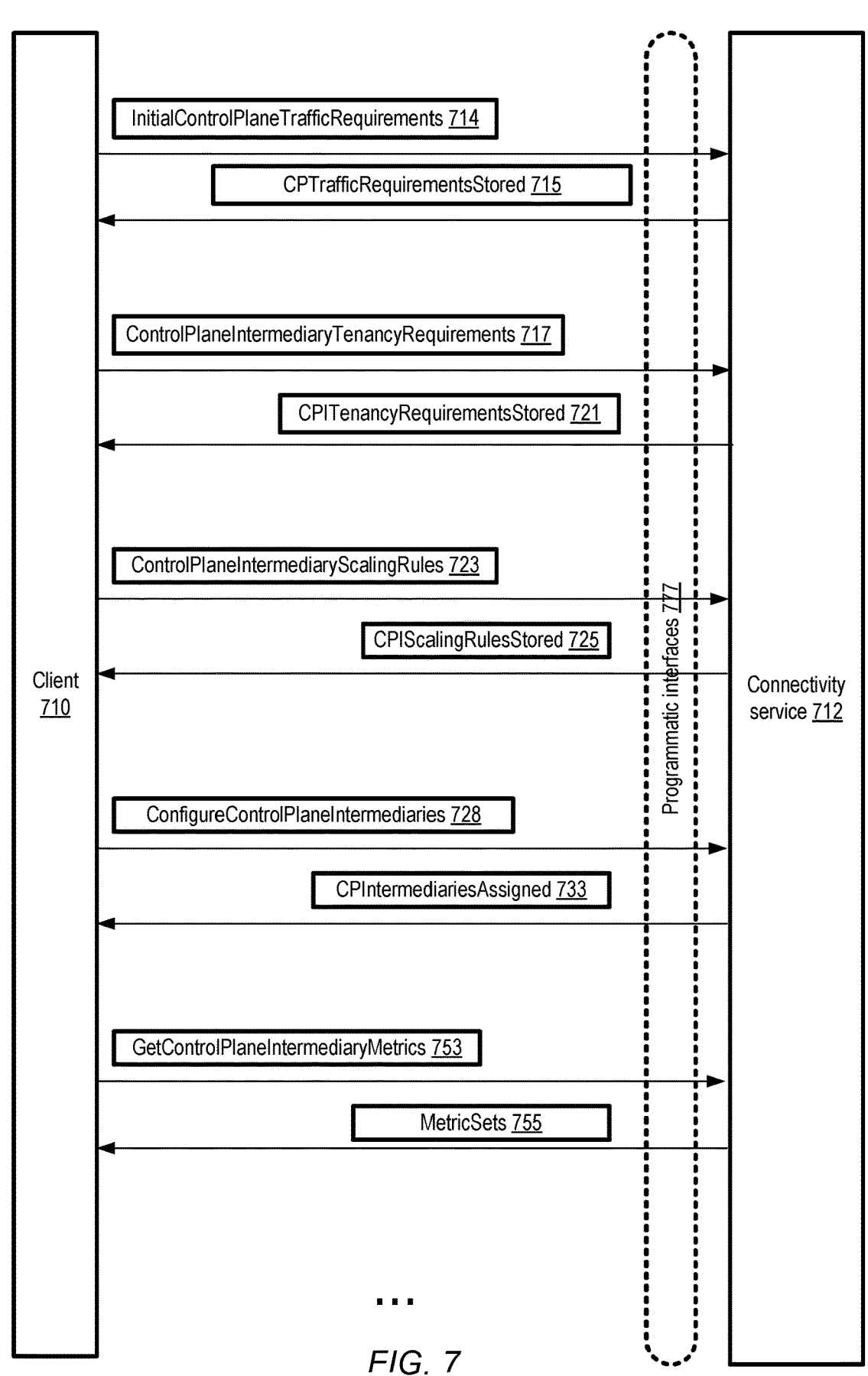
FIG. 7 illustrates example programmatic interactions related to functionality provided by a connectivity service of a cloud provider network for control plane messages between RAN nodes and a core network, according to at least some embodiments.

FIG. 7 illustrates example programmatic interactions related to functionality provided by a connectivity service of a cloud provider network for control plane messages between RAN nodes and a core network, according to at least some embodiments. A connectivity service 712, similar in features and functionality to connectivity service 125 of FIG. 1, may implement a set of programmatic interfaces 777 in the depicted embodiment. The programmatic interfaces may include, for example, one or more web-based consoles, command-line tools, APIs, and/or graphical user interfaces. The programmatic interfaces can be used by connectivity service clients 710 (such as owners/administrators of radio-based applications) to submit requests and messages pertaining to the establishment and ongoing management of connectivity for control plane messages between RAN nodes and core network components, and receive corresponding responses in various embodiments.

A client 710 may submit an initial set of requirements for control plane traffic of a radio-based application, e.g., indicating the approximate number and types of control plane messages expected to be sent from a RAN node to a CCPAE, in an InitialControlPlaneTrafficRequirements message 714 in the depicted embodiment. The requirements may be stored in a repository maintained by the connectivity service, and a CPTrafficRequirementsStored message 715 may be sent to the client via the programmatic interfaces 777 in some embodiments.

Clients 710 may be able to specify tenancy requirements for control plane traffic intermediary devices such as TLPEs in some embodiments, e.g., indicating whether they are willing to share the intermediary devices with other clients, share intermediary devices between RAN nodes of multiple radio-based applications of a single client, or share intermediary devices between multiple RAN nodes of the same radio-based application. Alternatively, clients may indicate that the intermediaries are to be used for a single RAN node (i.e., configured in single-tenant mode). The choices regarding tenancy may be specified, for example, via one or more ControlPlaneIntermediaryTenancyRequirements messages 717 in the depicted embodiment. The tenancy preferences indicated by the client may be saved at the connectivity service, and a CPTenancyRequirementsStored message 721 may be sent to the client.

In some embodiments, instead of or in addition to allowing resource managers of the connectivity service to scale up or scale down the intermediaries used for a given RAN-to-core configuration, a client 710 may submit scaling rules that can be used to decide the conditions under which configuration changes (such as adding TLPEs, removing TLPEs, replacing TLPEs with more computationally powerful TLPEs, etc.) should be initiated with regard to control plane message intermediaries. Such scaling rules may be specified in ControlPlaneIntermediaryScalingRules messages 723 in some embodiments. The scaling rules may for example indicate the set of metrics that should be monitored at the intermediary devices, thresholds of utilization, connection counts, etc., that should be used to trigger configuration changes, what the configuration changes should be, how information about planned configuration changes should be propagated to the RAN nodes and/or to CCPAEs, etc. After the scaling rules are saved at the connectivity service, a CPIScalingRulesStored message 725 may be sent to the client 710 in some embodiments.

Having specified the initial expected traffic levels, tenancy preferences and/or scaling rules, a client 710 may in some embodiments submit a ConfigureControlPlaneIntermediaries request 728 to cause a resource manager of the connectivity service to assign TLPEs or other intermediaries for the client's application in some embodiments. After the initial set of intermediaries is assigned, in at least some embodiments a CPIntermediariesAssigned message 733 may be sent to the client in such embodiments. The resource manager may later change the set of intermediaries (e.g., by adding/removing intermediaries, while ensuring that existing message flows are not disrupted) based on scaling rules provided by the client and/or based on default scaling rules of the connectivity service.

According to some embodiments, metrics pertaining to the set of control plane intermediaries may be collected and provided to clients 710 on demand. Examples of such metrics may include, among others, the number of intermediaries configured, the rate at which control plane messages in either direction are transmitted by the intermediaries as a function of time, configuration changes initiated automatically, causes of such configuration changes, and so on. A client 710 may submit a GetControlPlaneIntermediaryMetrics request 753 to obtain such metrics, and the requested metrics may be provided via one or more MetricSets messages 755 in the depicted embodiment. It is noted that programmatic interactions pertaining to the management of control plane traffic intermediaries for radio-based applications other than those interactions shown in FIG. 7 may be supported by a connectivity service in at least some embodiments.

Figure 8:
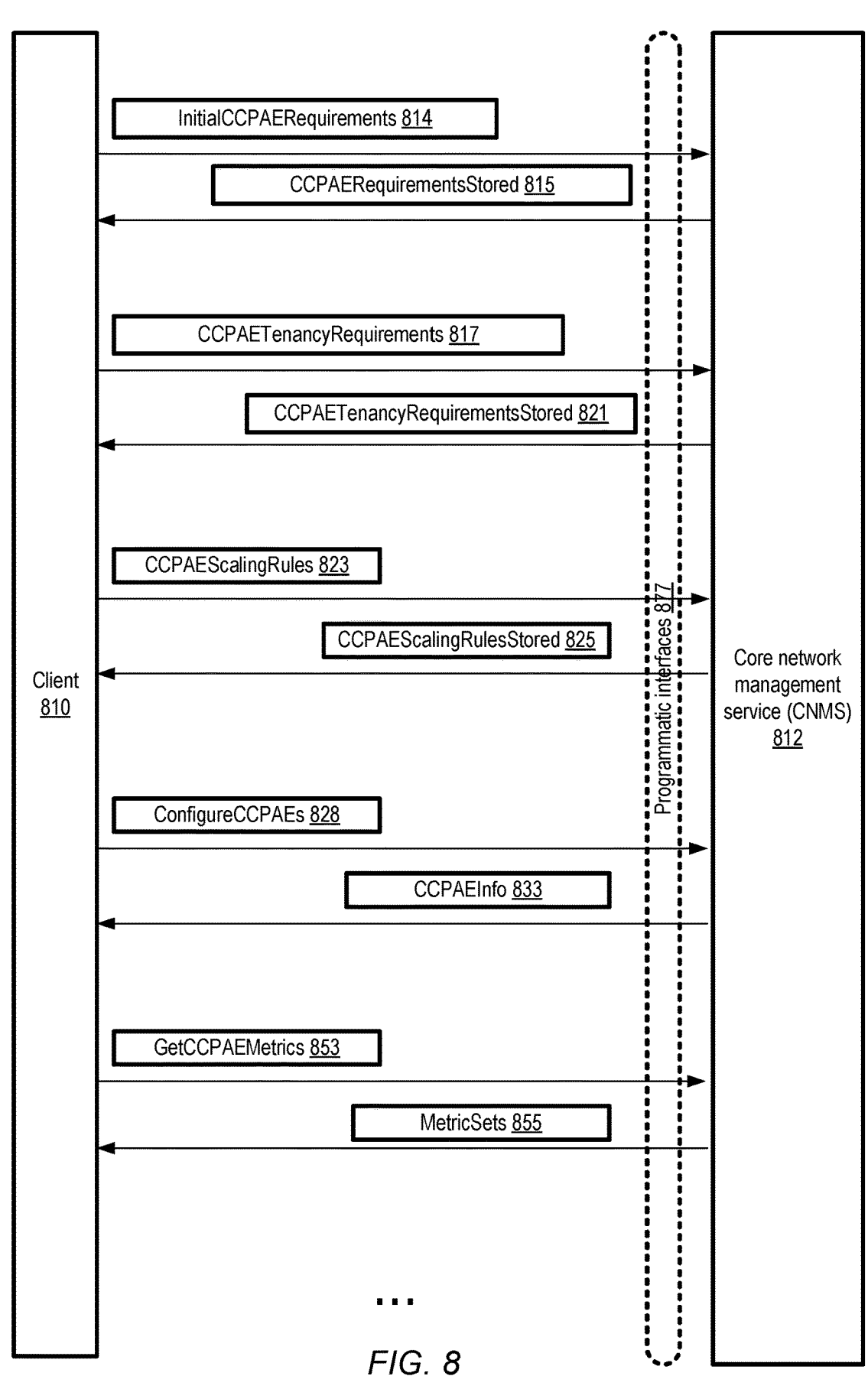
FIG. 8 illustrates example programmatic interactions related to management of cloud-based core network functions with which RAN nodes exchange control plane messages, according to at least some embodiments.

FIG. 8 illustrates example programmatic interactions related to management of cloud-based core network functions with which RAN nodes exchange control plane messages, according to at least some embodiments. Such cloud-based core network functions may be referred to as core network control plane access endpoints (CCPAEs) as discussed above. A core network management service (CNMS) 812, similar in features and functionality to CNMS 155 of FIG. 1, may implement a set of programmatic interfaces 877 in the depicted embodiment. The programmatic interfaces may include, for example, one or more web-based consoles, command-line tools, APIs, and/or graphical user interfaces. The programmatic interfaces can be used by CNMS clients 810 (such as owners/administrators of radio-based applications) to submit requests and messages pertaining to the establishment and ongoing management of network functions for control plane operations, and receive corresponding responses in various embodiments.

A client 810 may submit an initial set of requirements for one or more CCPAEs of a radio-based application, e.g., indicating the approximate number and types of control plane messages expected to be sent from a RAN node to a CCPAE, in an InitialCCPAERequirements message 814 in the depicted embodiment. The requirements may be stored in a repository maintained by the CNMS, and a CCPAER-equirementsStored message 815 may be sent to the client via the programmatic interfaces 877 in some embodiments.

Clients 810 may be able to specify tenancy requirements for CCPAEs in some embodiments, e.g., indicating whether they are willing to share CCPAEs (or the resources such as VNFEs at which CCPAEs are run) with other clients, share CCPAEs/resources for processing control plane messages from RAN nodes of multiple radio-based applications of a single client, or share CCPAEs/resources between multiple RAN nodes of the same radio-based application. Alternatively, clients may indicate that a given CCPAE or resource is to be used for a single RAN node (i.e., configured in single-tenant mode). The choices regarding tenancy may be specified, for example, via one or more CCPAETenancyRe-quirements messages 817 in the depicted embodiment. The tenancy preferences indicated by the client may be saved at the connectivity service, and a CCPAETenancyRequire-mentsStored message 821 may be sent to the client.

In some embodiments, instead of or in addition to allow-ing network function managers of the CNMS to scale up or scale down the CCPAEs used for a given radio-based application configuration, a client 810 may submit scaling rules that can be used to decide the conditions under which configuration changes (such as adding CCPAEs, removing CCPAEs, replacing CCPAEs with more computationally powerful CCPAEs, etc.) should be initiated with regard to CCPAEs. Such scaling rules may be specified in CCPAES-calingRules messages 823 in some embodiments. The scaling rules may for example indicate the set of metrics that should be monitored at the CCPAEs, thresholds of resource utilization, connection counts, etc., that should be used to trigger configuration changes, what the configuration changes should be, how information about planned configu-ration changes should be propagated to the RAN nodes and/or to control plane traffic intermediaries, etc. After the scaling rules are saved at the connectivity service, a CCPA-EScalingRulesStored message 825 may be sent to the client 810 in some embodiments.

Having specified the initial requirements, tenancy prefer-ences and/or scaling rules, a client 810 may in some embodi-ments submit a ConfigureCCPAEs request 828 to cause a network function manager of the CNMS to assign CCPAEs for the client's application in some embodiments. After the initial set of CCPAEs is assigned, in at least some embodi-ments a CCPAEsAssigned message 833 may be sent to the client in such embodiments. The network function manager may later change the set of CCPAEs (e.g., by adding/removing CCPAEs, while ensuring that existing message flows are not disrupted) based on scaling rules provided by the client and/or based on default scaling rules of the CNMS.

According to some embodiments, metrics pertaining to the set of CCPAEs may be collected and provided to clients 810 on demand. Examples of such metrics may include, among others, the number of CCPAEs configured, the rate at which control plane messages in either direction are trans-mitted by the CCPAEs as a function of time, CCPAE configuration changes initiated automatically, causes of such configuration changes, and so on. A client 810 may submit a GetCCPAEMetrics request 853 to obtain such metrics, and the requested metrics may be provided via one or more MetricSets messages 855 in the depicted embodiment. It is noted that programmatic interactions pertaining to the management of CCPAEs for radio-based applications other than those interactions shown in FIG. 8 may be supported by a CNMS in at least some embodiments.

FIG. 9 is a flow diagram illustrating aspects of operations which may be performed to manage control plane interac-tions between RAN nodes and core networks, according to at least some embodiments. As shown in element 901, a pool of control plane traffic intermediaries (CPTIs) (e.g., trans-port layer protocol endpoints such as SCTP endpoints imple-mented at respective virtual machine or physical servers) may be established for transfer of control plane messages between RAN nodes of one or more radio-based applica-tions and core network control plane access endpoints (CCPAEs) (such as AMFs).

A resource manager (RM) of the connectivity service may assign one or more CPTIs for traffic between a given RAN node of a radio-based application and a set S1 of CCPAEs (element 904), e.g., based on tenancy preferences and initial performance requirements indicated by the client whose radio-based application is being implemented. Individual CPTIs may transmit control plane messages in both direc-tions (element 907) in various embodiments—e.g., from a given RAN node to a selected CCPAE (selected, for example, using a load balancing algorithm implemented at the CPTI), or from a CCPAE of S1 back to a RAN node.

Scalability-related operations and other reconfiguration operations may be initiated largely independently for the CPTIs and the CCPAEs in the depicted embodiments. For example, as shown in element 911, a core network function manager (CNFM) may detect that a triggering condition for changing the configuration of S1 has been met (e.g., based on analysis of performance metrics collected from the CCPAEs, based on notifications of impending scheduled mainte-nance events such as software or hardware upgrades/updates for the CCPAEs, etc.) In response to detecting such a trigger, the CNFM may modify S1's configuration (element 914). Examples of the modifications may include adding/remov-ing CCPAEs from S1, replacing individual CCPAEs with upgraded/reconfigured versions, and the like. The changes to the CCPAE set may be made in at least some embodiments without requiring changes to existing RAN node configu-ration and without disrupting existing flows of control plane messages from RAN nodes to the core network. A small set of changes to CPTI configuration may be required in some embodiments—e.g., a CPTI may be notified that a new CCPAE has been established, and the IP address of the CCPAE may be added to the set of CCPAE addresses to which that CPTI distributes control plane messages received from a RAN node. In one embodiment, existing SCTP connections being handled using a given CCPAE CCPAE1 may remain in operation if a new CCPAE CCPAE2 is added to S1, but at least a subset of new SCTP connections (for which establishment requests are received from a RAN node after CCPAE2 is added to S1) may be directed to CCPAE2 instead of CCPAE1. In some embodiments, transport layer connections may be migrated from one CCPAE (a migration source CCPAE) to another (a migration destination CCPAE), e.g., to enable upgrades at the source CCPAE. At least some of the CCPAEs of S1 may be configured in active-active mode in some embodiments, with state infor-mation of various control plane message flows being repli-cated at multiple CCPAEs of S1, thus enabling any given CCPAE to process messages of any given flow.

As shown in element 912, a resource manager (RM) may detect that a triggering condition for modifying the CPTI configuration has been met (e.g., based on performance metrics collected from the CPTIs, based on notifications of impending software/hardware upgrades to the CPTIs, etc.). In response, the RM may change the set of CPTIs being used for a given radio-based application (element 915), e.g., by adding/removing CPTIs. Major configuration changes at the RAN nodes or at the set S1 of CCPAEs may not be required in at least some embodiments (although network address information of CPTIs may be updated at the RAN nodes and/or at the CCPAEs), and existing flows of control plane messages may not be disrupted in various embodiments. In some embodiments, connections that were being processed at a given CPTI may be migrated to another CPTI to ensure that the impact (to the CCPAEs and RAN nodes) of the configuration changes at the CPTI layer is minimized. The number of CPTIs assigned to a radio-based application may be increased/decreased in some embodiments by an RM without causing the number of CCPAEs in S1 to be changed.

Figure 10:
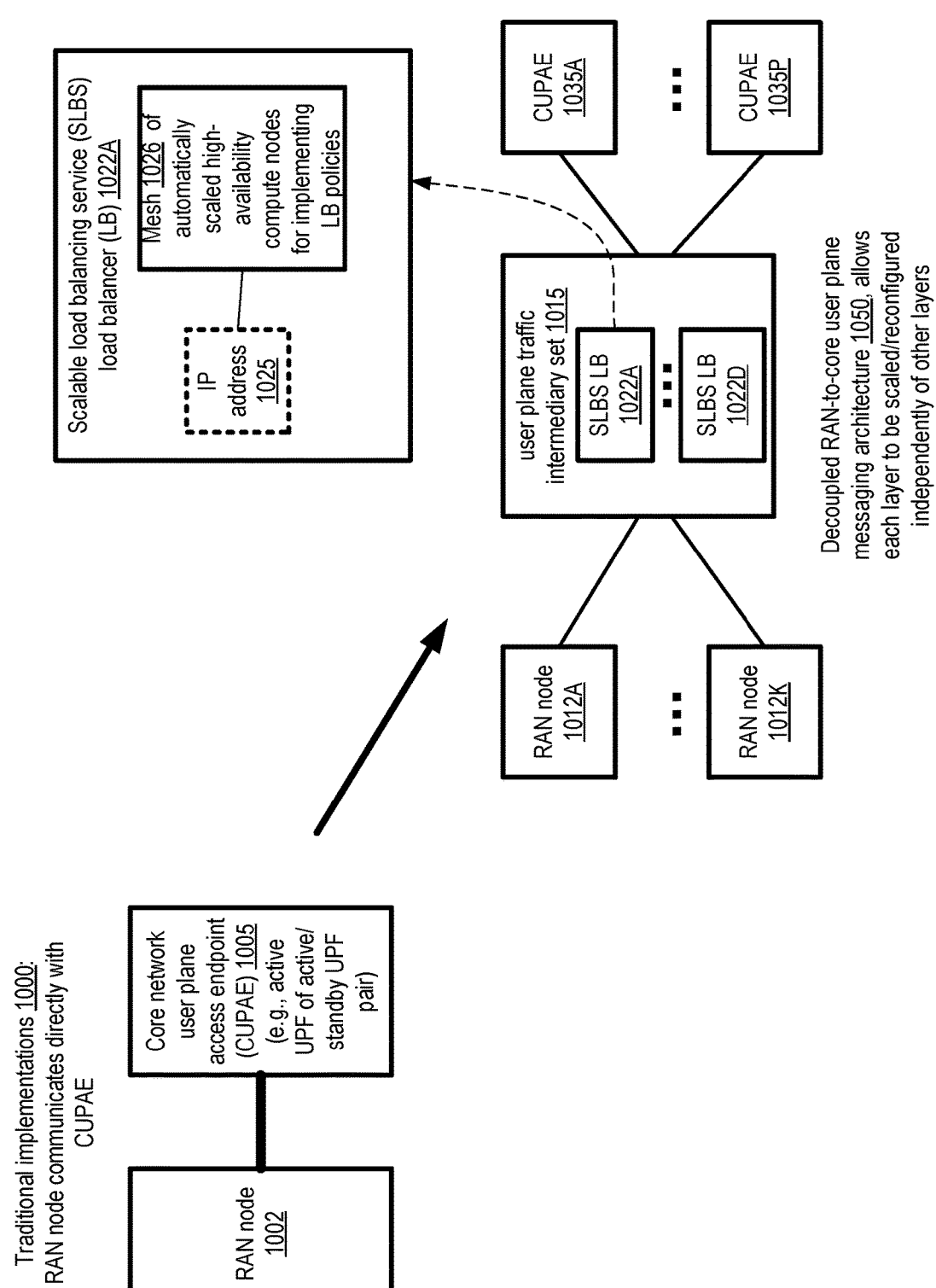
FIG. 10 illustrates an example of a decoupled RAN-to-core user plane messaging architecture, according to at least some embodiments.

FIG. 10 illustrates an example of a decoupled RAN-to-core user plane messaging architecture, according to at least some embodiments. In a traditional implementation 1000, one or more network connections linking a RAN node 1002 directly (without intermediaries) to a core network user plane access endpoint (CUPAE) 1005 may be set up for control plane traffic. As a result, if and when such a connection is terminated, e.g., in order to upgrade the software being used for the CUPAE operations, user plane operations at both sides (the RAN node and the core network) may be affected. Furthermore, if more computing power is needed for CUPAE network functions, and an additional CUPAE is accordingly configured, an additional RAN node (or additional components such as CUs of the RAN node) may also have to be configured, since each CUPAE is expecting to communicate with a respective RAN node. Such additional RAN node components may have to be set up even if the amount of computation required for user plane operations on the RAN node side can be handled perfectly well by the existing RAN node components. In some traditional implementations, pairs of CUPAEs such as UPFs (User Plane Functions) may be run in active-passive mode, with one CUPAE remaining active while the other remains largely idle, waiting to take over the functionality of the active CUPAE in the event of a failure. Such active-passive configuration results in lower overall resource utilization than if a passive CUPAE did not have to be configured.

These types of problems may be avoided in some embodiments using a decoupled RAN-to-core user plane messaging architecture 1050 implemented with the help of a connectivity service similar in functionality to connectivity service 125 of FIG. 1. In such an embodiment, a user plane traffic intermediary set 1015 may be established by the connectivity service for one or more radio-based applications. The intermediary set may, for example, include one or more load balancers (LBs) of a scalable load balancing service (SLBS) of a provider network at which the connectivity service is implemented in some embodiments, such as SLBS LB 1022A or SLBS LB 1022D. Collectively, the intermediary set 1015 may enable messages to be transferred in either direction between a set of RAN nodes 1012 (such as RAN nodes 1012A and 1012K) of the application(s) and a set of CUPAEs 1035, such as CUPAEs 1035A and 1035P. The decoupling approach may allow the RAN node layer and the CUPAEs to be scaled up or down (or more generally, reconfigured) entirely or largely independently of each other. In at least some embodiments, the intermediary set may be reconfigured or scaled without affecting existing control plane packet flows. In at least some embodiments, all the CUPAEs of a group of CUPAEs set up for a given set of radio-based applications may run in active-active mode, with state information for various user plane message flows being replicated at all the CUPAEs of the group, and all the CUPAEs active concurrently (e.g., processing messages of respective flows during overlapping time intervals) instead of waiting in passive mode.

A given SLBS LB such as 1022A may be implemented in some embodiments as a collection or mesh 1026 of automatically scaled (by administrative components of the SLBS) high-availability compute nodes implementing one or more load balancing algorithms or policies, with a single IP address 1025 assigned to the LB as a whole. As and when additional computing power is needed, administrative components of the SLBS may add compute nodes to the mesh; multiple nodes of the mesh may be organized in a redundant configuration to ensure very high levels of availability. In at least some embodiments, the SLBS may be used to provide load balancing for numerous other services of a provider network, including a virtualized computing service, storage services, and so on, which use an SLBS-supported set of commonly-used transport layer protocols such as TCP (Transmission Control Protocol) or UDP. If a radio-based application uses one of the supported set of protocols (such as UDP, in the case of 5G applications following ETSI standards), using SLBS LBs may be appropriate. In scenarios in which the SLBS does not support the transport layer protocol (e.g., if the user plane messages also used SCTP as is the case for 5G control plane messages) being used for user plane messages, a fleet of transport layer protocol endpoints (TLPEs) may also be used for control plane messages in at least some embodiments.

FIG. 11 and FIG. 12 illustrate examples of configuration options for RAN nodes, user plane traffic intermediaries, and core network user plane access endpoints, according to at least some embodiments. In configuration option 1150A of FIG. 11, a given traffic intermediary may be configured for user plane communications between a given RAN node and a given CUPAE. Thus, for example, load balancer (LB) 1122A of control plane traffic intermediary set 1115 is used for user plane messages flowing between RAN node 1112A of an application App1, and App1 CUPAE 1132A. LB 1122B may be used for user plane messages flowing between RAN node 1112B of a different application App2, and App2 CUPAE 1132B. This option may be referred to as a 1:1:1 configuration, in which 1 RAN node is coupled to 1 CUPAE using 1 user plane intermediary such as an LB.

In configuration option 1150B of FIG. 11, N RAN nodes of a given client of the connectivity service may be linked to a single CUPAE. For example, as shown, LB 1162 of user plane traffic intermediary set 1155 may provide bidirectional connectivity between App1 RAN node 1152A and App1 CUPAE 1142, and the same LB 1162 may also provide bidirectional connectivity between App1 RAN node 1152B and App1 CUPAE 1142. Option 1150B may be referred to as an N: 1:1 configuration.

In configuration option 1150C of FIG. 11, a single RAN node of a given client of the connectivity service may be linked to multiple CUPAEs configured in active-active mode via a given LB. For example, as shown, LB 1174 of user plane traffic intermediary set 1185 may provide bidirectional connectivity between App1 RAN node 1172 and App1 CCPAEs 1177A, 1177B and 1177C. Option 1150B may be referred to as a 1:1:N configuration.

Configuration option 1250A of FIG. 12 shows a multi-tenant LB being used to connect RAN nodes of different clients or different radio-based applications to respective CUPAEs. User plane traffic intermediary set 1215 includes multi-tenant LB 1222, which transmits user plane messages between RAN node 1212A of an application App1 and CUPAE 1232A of App1. Multi-tenant LB 1222 also conveys messages between RAN node 1212B of a different application (App2), and App2 CUPAE 1232B.

In configuration option 1250B, a multi-tenant intermediary may be combined with a multi-tenant CUPAE. User plane traffic intermediary set 1255 comprises an LB 1262, which transfers user plane messages between RAN nodes of several different applications or clients (such as App1 RAN node 1252A and App2 RAN node 1252B) to a shared CUPAE 1242. Configuration option 1250B differs from configuration option 1150B of FIG. 11 in that the multiple RAN nodes 1152 of option 1150B are used for the same application (App1), while the RAN nodes 1252A and 1252B are used for different applications (which may in some cases be run in behalf of different clients of the connectivity service, or different clients of the provider network at which the connectivity service is implemented). Other configuration options than those shown in FIG. 11 and FIG. 12, or blended versions of the configuration options shown in FIG. 11 or FIG. 12, may be used in some embodiments for decoupling control plane traffic of radio-based applications.

Figure 13:
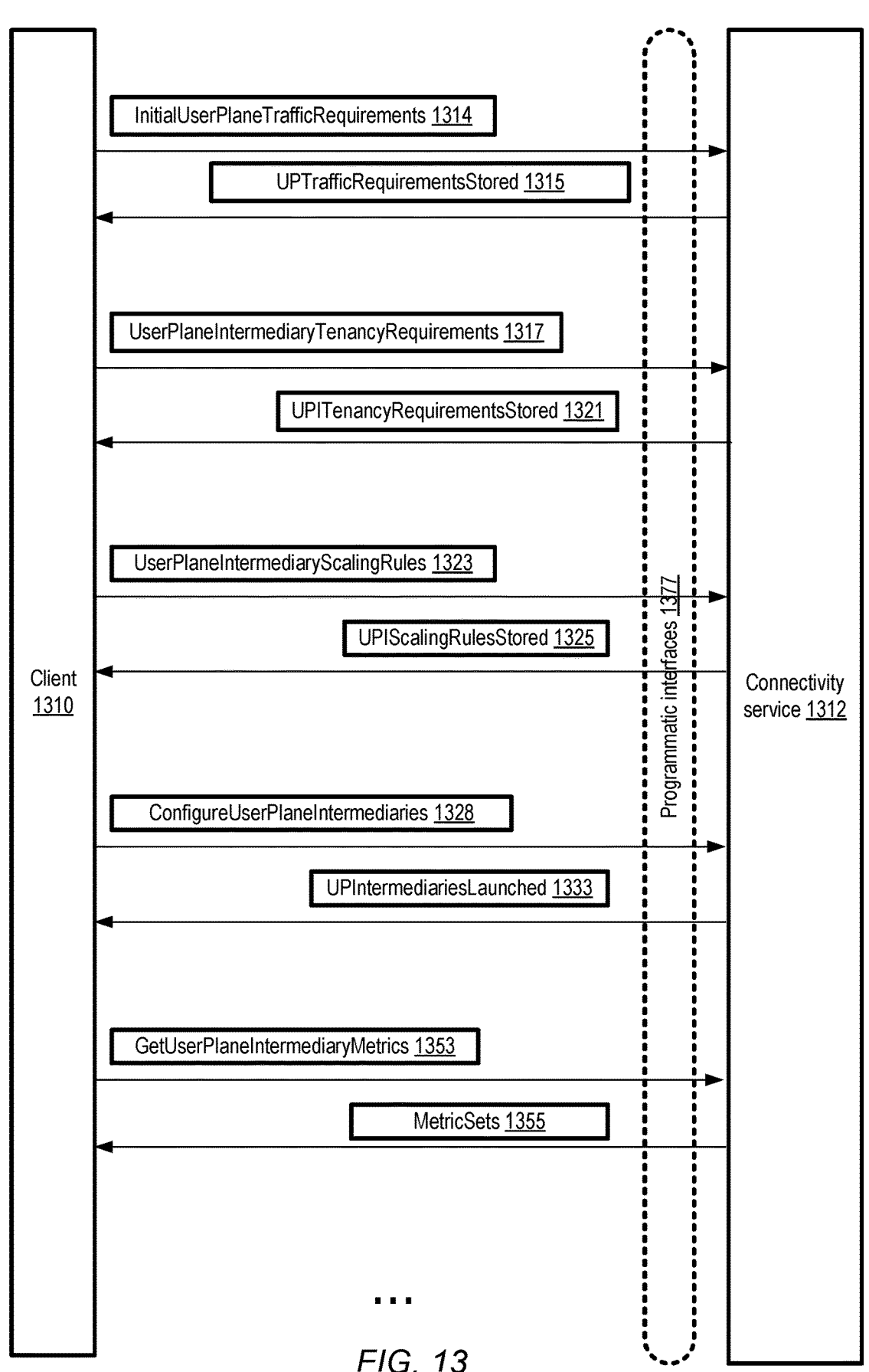
FIG. 13 illustrates example programmatic interactions related to functionality provided by a connectivity service of a cloud provider network for user plane messages between RAN nodes and a core network, according to at least some embodiments.

FIG. 13 illustrates example programmatic interactions related to functionality provided by a connectivity service of a cloud provider network for user plane messages between RAN nodes and a core network, according to at least some embodiments. A connectivity service 1312, similar in features and functionality to connectivity service 125 of FIG. 1, may implement a set of programmatic interfaces 1377 in the depicted embodiment. The programmatic interfaces may include, for example, one or more web-based consoles, command-line tools, APIs, and/or graphical user interfaces. The programmatic interfaces can be used by connectivity service clients 1310 (such as owners/administrators of radio-based applications) to submit requests and messages pertaining to the establishment and ongoing management of connectivity for user plane messages between RAN nodes and core network components, and receive corresponding responses in various embodiments.

A client 1310 may submit an initial set of requirements for user plane traffic of a radio-based application, e.g., indicating the approximate number and types of user plane messages expected to be sent from a RAN node to a CUPAE, in an InitialUserPlaneTrafficRequirements message 1314 in the depicted embodiment. The requirements may be stored in a repository maintained by the connectivity service, and a UPTrafficRequirementsStored message 1315 may be sent to the client via the programmatic interfaces 1377 in some embodiments.

Clients 1310 may be able to specify tenancy requirements for user plane traffic intermediary devices such as load balancers (LBs) in some embodiments, e.g., indicating whether they are willing to share the intermediary devices with other clients, share intermediary devices between RAN nodes of multiple radio-based applications of a single client, or share intermediary devices between multiple RAN nodes of the same radio-based application. Alternatively, clients may indicate that the intermediaries are to be used for a single RAN node (i.e., configured in single-tenant mode). The choices regarding tenancy may be specified, for example, one or via more UserPlaneIntermediaryTenancyRequirements messages 1317 in the depicted embodiment. The tenancy preferences indicated by the client may be saved at the connectivity service, and a UPTenancyRequirementsStored message 1321 may be sent to the client.

In some embodiments, instead of or in addition to allowing administrative components of the connectivity service (or a load balancing service, if a load balancing service is being used for the intermediaries) to scale up or scale down the intermediaries used for a given RAN-to-core configuration, a client 1310 may submit scaling rules that can be used to decide the conditions under which configuration changes (such as adding intermediaries, removing g intermediaries, replacing intermediaries with more computationally powerful intermediaries, etc.) should be initiated with regard to user plane message intermediaries. Such rules may in scaling be specified UserPlaneIntermediaryScalingRules messages 1323 in some embodiments. The scaling rules may for example indicate the set of metrics that should be monitored at the intermediary devices, thresholds of utilization, connection counts, etc., that should be used to trigger configuration changes, what the configuration changes should be, how information about planned configuration changes should be propagated to the RAN nodes and/or to CUPAEs, etc. After the scaling rules are saved at the connectivity service, a UPIScalingRulesStored message 1325 may be sent to the client 1310 in some embodiments.

Having specified the initial expected traffic levels, tenancy preferences and/or scaling rules, a client 1310 may in some embodiments submit a ConfigureUserPlaneIntermediaries request 1328 to cause a resource manager of the connectivity service to assign LBs or other user plane intermediaries for the client's application in some embodiments. After the initial set of intermediaries is assigned, in at least some embodiments a UPIntermediariesAssigned message 1333 may be sent to the client in such embodiments. The resource manager may later change the set of user plane intermediaries (e.g., by adding/removing intermediaries, while ensuring that existing message flows are not disrupted) in some embodiments based on scaling rules provided by the client and/or based on default scaling rules of the connectivity service. In embodiments in which a load balancing service of the cloud provider network is being used for the intermediaries, the load balancing service may make scaling and/or other reconfiguration decisions.

According to some embodiments, metrics pertaining to the set of user plane intermediaries may be collected and provided to clients 1310 on demand. Examples of such metrics may include, among others, the number of intermediaries configured, the rate at which user plane messages in either direction are transmitted by the intermediaries as a function of time, configuration changes initiated automatically, causes of such configuration changes, and so on. A client 1310 may submit a GetUserPlaneIntermediaryMetrics request 1353 to obtain such metrics, and the requested metrics may be provided via one or more MetricSets messages 1355 in the depicted embodiment. It is noted that programmatic interactions pertaining to the management of user plane traffic intermediaries for radio-based applications other than those interactions shown in FIG. 13 may be supported by a connectivity service in at least some embodiments.

Figure 14:
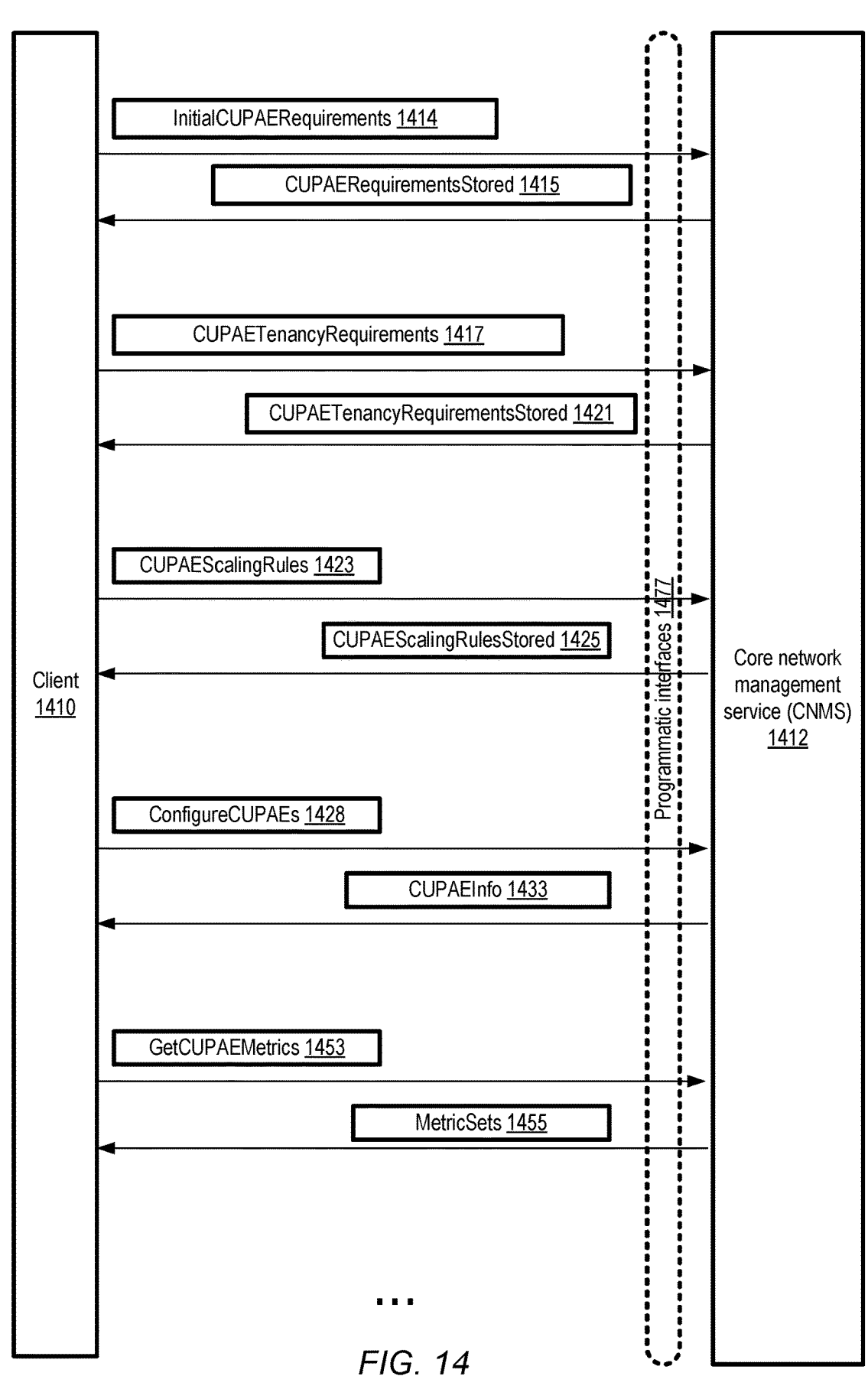
FIG. 14 illustrates example programmatic interactions related to management of cloud-based core network functions with which RAN nodes exchange user plane messages, according to at least some embodiments.

FIG. 14 illustrates example programmatic interactions related to management of cloud-based core network functions with which RAN nodes exchange user plane messages, according to at least some embodiments. Such cloud-based core network functions may be referred to as core network control plane access endpoints (CUPAEs) as discussed above. A core network management service (CNMS) 1412, similar in features and functionality to CNMS 155 of FIG. 1, may implement a set of programmatic interfaces 1477 in the depicted embodiment. The programmatic interfaces may include, for example, one or more web-based consoles, command-line tools, APIs, and/or graphical user interfaces. The programmatic interfaces can be used by CNMS clients 1410 (such as owners/administrators of radio-based applications) to submit requests and messages pertaining to the establishment and ongoing management of network functions for user plane operations, and receive corresponding responses in various embodiments.

A client 1410 may submit an initial set of requirements for one or more CUPAEs of a radio-based application, e.g., indicating the approximate number and types of user plane messages expected to be sent from a RAN node to a CUPAE, in an InitialCUPAERequirements message 1414 in the depicted embodiment. The requirements may be stored in a repository maintained by the CNMS, and a CUPAERequirementsStored message 1415 may be sent to the client via the programmatic interfaces 1477 in some embodiments.

Clients 1410 may be able to specify tenancy requirements for CUPAEs in some embodiments, e.g., indicating whether they are willing to share CUPAEs (or the resources such as VNFEs at which CUPAEs are run) with other clients, share CUPAEs/resources for processing user plane messages from RAN nodes of multiple radio-based applications of a single client, or share CUPAEs/resources between multiple RAN nodes of the same radio-based application. Alternatively, clients may indicate that a given CUPAE or resource is to be used for a single RAN node (i.e., configured in single-tenant mode). The choices regarding tenancy may be specified, for example, via one or more CUPAETenancyRequirements messages 1417 in the depicted embodiment. The tenancy preferences indicated by the client may be saved at the connectivity service, and a CUPAETenancyRequirementsStored message 1421 may be sent to the client.

In some embodiments, instead of or in addition to allowing network function managers of the CNMS to scale up or scale down the CUPAEs used for a given radio-based application configuration, a client 1410 may submit scaling rules that can be used to decide the conditions under which configuration changes (such as adding CUPAEs, removing CUPAEs, replacing CUPAEs with more computationally powerful CUPAEs, etc.) should be initiated with regard to CUPAEs. Such scaling rules may be specified in CUPAEScalingRules messages 1423 in some embodiments. The scaling rules may for example indicate the set of metrics that should be monitored at the CUPAEs, thresholds of resource utilization, connection counts, etc., that should be used to trigger configuration changes, what the configuration changes should be, how information about planned configuration changes should be propagated to the RAN nodes and/or to user plane traffic intermediaries, etc. After the scaling rules are saved at the connectivity service, a CUPAEScalingRulesStored message 1425 may be sent to the client 1410 in some embodiments.

Having specified the initial requirements, tenancy preferences and/or scaling rules, a client 1410 may in some embodiments submit a ConfigureCUPAEs request 1428 to cause a network function manager of the CNMS to assign CUPAEs for the client's application in some embodiments. After the initial set of CUPAEs is assigned, in at least some embodiments a CUPAEsAssigned message 1433 may be sent to the client in such embodiments. The network function manager may later change the set of CUPAEs (e.g., by adding/removing CUPAEs, while ensuring that existing message flows are not disrupted) based on scaling rules provided by the client and/or based on default scaling rules of the CNMS.

According to some embodiments, metrics pertaining to the set of CUPAEs may be collected and provided to clients 1410 on demand. Examples of such metrics may include, among others, the number of CUPAEs configured, the rate at which user plane messages in either direction are transmitted by the CUPAEs as a function of time, CUPAE configuration changes initiated automatically, causes of such configuration changes, and so on. A client 1410 may submit a GetCUPAEMetrics request 1453 to obtain such metrics, and the requested metrics may be provided via one or more MetricSets messages 1455 in the depicted embodiment. It is noted that programmatic interactions pertaining to the management of CUPAEs for radio-based applications other than those interactions shown in FIG. 14 may be supported by a CNMS in at least some embodiments.

FIG. 15 is a flow diagram illustrating aspects of operations which may be performed to manage user plane interactions between RAN nodes and core networks, according to at least some embodiments. As shown in element 1504, a resource manager (RM) of a connectivity service similar in features and functionality to connectivity service 125 of FIG. 1 may assign one or more user plane traffic intermediaries (UPTIs) for traffic between a given RAN node of a radio-based application and a set S1 of CUPAEs. At least a subset of the CUPAEs (such as 5G UPFs) of S1 may be configured in active-active mode in various embodiments, such that processing of respective user plane messages at the active-active CUPAEs may be performed at least partly in parallel, instead of requiring some CUPAEs to wait passively to take over the workload of other CUPAEs. In some embodiments, the UPTIs may comprise load balancers implemented at a scalable load balancing service of a cloud provider network; in other embodiments, the connectivity service may establish its own pool of UPTIs. The UPTIs may be configured based on tenancy preferences and initial performance requirements indicated by the client whose radio-based application is being implemented in at least some embodiments. In some embodiments in which both control plane and user plane traffic between RAN nodes and core network functions is decoupled, UPTIs may be configured independently of control plane traffic intermediaries (CPTIs), and CUPAEs may be configured independently of CCPAEs, depending for example on the mix of user plane versus control plane traffic of the radio-based applications. For example, for some types of applications such as 5G voice applications, the ratio of control plane messages to user plane messages may be lower than for IoT applications, so the resources that have to be devoted to control plane messaging versus user plane messaging may differ, and control plane resources may be scaled up at a different rate than user plane resources.

Individual UPTIs may transmit user plane messages in both directions in various embodiments (element 1507)—e.g., from a given RAN node to a selected CUPAE (selected, for example, using a load balancing algorithm implemented at the UPTI), or from a CUPAE of S1 back to a RAN node.

Scalability-related operations and other reconfiguration operations may be initiated largely independently for the UPTIs and the CUPAEs in the depicted embodiments. For example, as shown in element 1511, a core network function manager (CNFM) may detect that a triggering condition for changing the configuration of S1 has been met (e.g., based on analysis of performance metrics collected from the CUPAEs, based on notifications of impending software or hardware upgrades for the CUPAEs, etc.) In response to detecting such a trigger, the CNFM may modify S1's configuration (element 1514). Examples of the modifications may include adding/removing CUPAEs from S1, replacing individual CUPAEs with upgraded/reconfigured versions, and the like. The changes to the CUPAE set may be made in at least some embodiments without requiring changes to existing RAN node configuration and without disrupting existing flows of user plane messages from RAN nodes to the core network. A small set of changes to UPTI configuration may be required in some embodiments—e.g., a UPTI may be notified that a new CUPAE has been established, and the IP address of the CUPAE may be added to the set of CUPAE addresses to which that UPTI distributes control plane messages received from a RAN node. In one embodiment, existing user message flows being handled using a given CUPAE CUPAE1 may remain in operation if a new CUPAE CUPAE2 is added to S1, but at least a subset of new user plane message flows (whose messages are received from a RAN node after CUPAE2 is added to S1) may be directed to CUPAE2 instead of CUPAE1. In some embodiments, transport layer message flows may be migrated from one CUPAE (a migration source CUPAE) to another (a migration destination CUPAE), e.g., to enable upgrades at the source CUPAE. At least some of the CUPAEs of S1 may be configured in active-active mode in some embodiments as indicated above, with state information of various user plane message flows being replicated at multiple CUPAEs of S1, thus enabling any given CCPAE to process messages of any given flow.

In various embodiments, if the UPTIs are managed by a scalable load balancing service (SLBS) or a similar service other than the connectivity service itself (as determined in element 1512), the SLBS or other service may manage any changes needed to the UPTI configuration (element 1530). For example, if workload is increasing, compute nodes may be added to the collection or mesh of compute nodes implementing the load balancing algorithm for the user plane traffic.

If the UPTIs are managed by the connectivity service (as also detected in element 1512), a resource manager (RM) may of the connectivity service may at some point detect that a triggering condition for modifying the UPTI configuration has been met (e.g., based on performance metrics collected from the UPTIs, based on notifications of impending software/hardware upgrades to the UPTIs, etc.) (element 1517). In response, the RM may change the set of UPTIs being used for a given radio-based application (element 1519), e.g., by adding/removing UPTIs. Major configuration changes at the RAN nodes or at the set S1 of CUPAEs may not be required in at least some embodiments (although network address information of UPTIs may be updated at the RAN nodes and/or at the CUPAEs), and existing flows of user plane messages may not be disrupted in various embodiments. It is noted that in various embodiments, some of the operations shown in the flow diagrams of FIG. 9 and/or FIG. 15 may be implemented in a different order than that shown in the figure, or may be performed in parallel rather than sequentially. Additionally, some of the operations shown in FIG. 9 and/or FIG. 15 may not be required in one or more implementations.

FIG. 16 illustrates examples of premises at which resources for virtualized network function execution and traffic intermediaries for messages between RAN nodes and core networks may be managed by a cloud provider service, according to at least some embodiments. Within a given country or state such as country 1605A or country 1605B, one or more provider network regions (PNRs) may be set up, with each PNR comprising one or more availability zones or AZs. For example, in country 1605A, PNR 1610A may comprise availability zones 1621A and 1621B, each comprising numerous servers or hosts at which VNFs and/or traffic intermediaries (for control plane messages, user plane message, or both control plane and user plane messages) can be configured. Such resources are referred to in FIG. 16 as RVTIs. In at least some embodiments, VNFs of RAN nodes, core networks and/or the intermediaries may be implemented at least in part using compute instances of a virtualized computing service (VCS) of the cloud provider network. AZ 1621A may comprise RVTIs 1661A, while AZ 1621B may comprise RVTIs 1661B. PNR 1610B of country 1605A may comprise AZs 1621C, 1621D and 1621E, with RVTIs 1661C. 1661D and 1661E respectively. Country 1605B may comprise PNR 1610K, with AZs 1621F. 1621G and 1621H; these AZs may comprise RVTIs 1661F, 1661G and 1661H respectively.

In some countries, one or more local zones and/or third-party data centers (e.g., data centers of an entity which is not the operator of the cloud provider network and is not the entity at whose request radio-based are deployed) may be used to host compute instances managed by a VCS of a provider network, and such compute instances may also be used for executing VNFs and/or for running traffic intermediaries. For example, RVTIs 1661J may be available at third-party data center 1630A in country 1605A, and RVTIs 1661K may be located at third-party data center 1630B in country 1605B. Local zone 1640A in country 1605A may include RVTIs 1661L, while local zone 1640B in country 1605B may include RVTIs 1661L.

Data centers of clients of the cloud provider network, e.g., organizations or entities wishing to deploy radio-based applications, may also be used to run VNFs and traffic intermediaries at resources managed by the cloud provider network in some embodiments. At a given client data center, two types of RVTIs may be available: RVTIs at provider network extensions or outposts, and RVTIs comprising client-owned and client-managed equipment. In country 1605A, client data center 1650A may include provider network extensions 1652A with RVTIs 1661M, as well as client-owned infrastructure 1654A with RVTIs 1661N in the scenario depicted in FIG. 16. In country 1605B, client-owned data center 1650B may include RVTIs 1661P of provider network extension 1652B, and RVTIs 1661Q at client-owned infrastructure 1654B. Each of the types of premises shown in FIG. 16 may comprise pools of hosts or servers at which compute instances and/or software containers managed at least partly from the provider network (e.g., by a VCS or a container management service) can be run, and such compute instances and/or software containers may be used to implement VNFs and/or traffic intermediaries for control plane or user plane messages. The hosts/servers may, for example, comprise agents and/or virtualization management components (such as hypervisors) of a VCS, and as such, the hosts/servers may also be managed at least partly from the provider network.

Figure 17:
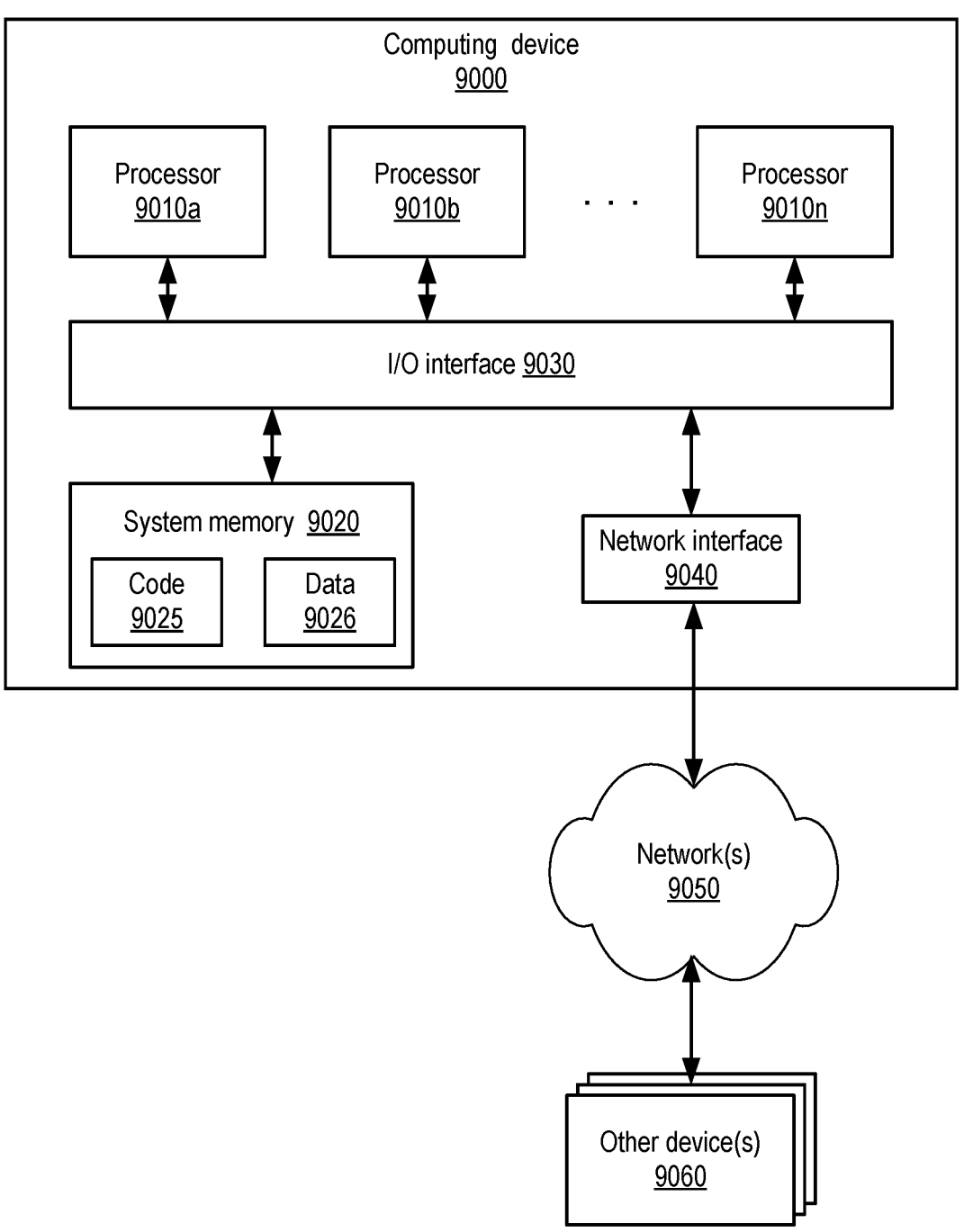
FIG. 17 is a block diagram illustrating an example computing device that may be used in at least some embodiments.

In at least some embodiments, a server that implements the types of techniques described herein (e.g., including functions of a connectivity service, a RAN service, a CNMS, and/or other services of a cloud provider network) may include a general-purpose computer system that includes or is configured to access one or more computer-accessible media. FIG. 17 illustrates such a general-purpose computing device 9000. In the illustrated embodiment, computing device 9000 includes one or more processors 9010 coupled to a system memory 9020 (which may comprise both non-volatile and volatile memory modules) via an input/ output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 16, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 16. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more processors and corresponding memory configured to implement a resource manager of a connectivity service of a suite of services provided via a cloud provider network;

a collection of transport layer protocol endpoints of the connectivity service provided via the cloud provider network, the transport layer protocol endpoints assignable as intermediaries to transport messages; and one or more other processors and corresponding memory configured to implement a core network function manager of a radio-based application management service of the cloud provider network;

wherein the resource manager is configured to:

assign, in response to a programmatic request from a client of the connectivity service, a transport layer protocol endpoint of the collection of transport layer protocol endpoints of the connectivity service provided via the cloud provider network as an intermediary for control plane messages transmitted between (a) a radio access network (RAN) node of a first radio-based application and (b) a set of core network control plane access endpoints of the radio-based application comprising at least a first core network control plane access endpoint and a second core network control plane access endpoint, wherein individual ones of the set of core network control plane access endpoints run one or more virtualized network functions of a core network;

wherein the transport layer protocol endpoint is configured to:

transmit a first control plane message of the radio-based application, received from the RAN node, to a particular core network control plane access endpoint of the set of core network control plane access endpoints; and transmit a second control plane message received from the particular core network control plane access endpoint to the RAN node; and wherein the core network function manager is configured to:

detect that a triggering condition for scaling up the set of core network control plane access endpoints has been satisfied; and increase, based at least in part on detection of the triggering condition, the number of core network control plane access endpoints included in the set of core network control plane access endpoints to which control plane messages, from the RAN node and transported via the transport layer protocol endpoint, are delivered, without causing a change to a configuration of the RAN node, and without causing an interruption in a flow of control plane messages sent from the RAN node to the particular core network control plane access endpoint.

2. The system as recited in claim 1, wherein the first control plane message is formatted in accordance with the Stream Control Transmission Protocol (SCTP).

3. The system as recited in claim 1, wherein the particular core network control plane access endpoint executes one or more of: (a) an Access and Mobility Management Function (AMF) network function of a 5G (Fifth Generation) radio-based technology stack, or (b) a Mobility Management Entity (MME) network function of a 4G (Fourth Generation) radio-based technology stack.

4. The system as recited in claim 1, wherein the resource manager is further configured to:

in response to detecting that a triggering condition for scaling up the transport layer protocol endpoints for the radio-based application has been satisfied, assign another transport layer protocol endpoint for processing control plane traffic of the radio-based application, without causing the number of core network control plane access endpoints in the set of core network control plane access endpoints to be changed.

5. The system as recited in claim 1, wherein the set of core network control plane access endpoints comprises another core network control plane access endpoint, and wherein the particular core network control plane access endpoint and the other core network control plane access endpoint are configured in an active-active mode, such that processing of a particular control plane message at the particular core network control plane access endpoint overlaps at least partly in time with processing of another control plane message at the other core network control plane access endpoint.

6. A computer-implemented method, comprising:

assigning a first transport layer protocol endpoint, of a collection of transport layer protocol endpoints of a connectivity service of a suite of services provided via a cloud provider network that provides the suite of services to a plurality of clients, as an intermediary to transmit control plane messages between (a) a first radio access network (RAN) node of a first radio-based application and (b) a set of core network control plane access endpoints of the first radio-based application comprising at least a first core network control plane access endpoint and a second core network control plane access endpoint, wherein individual ones of the set of core network control plane access endpoints run one or more virtualized network functions of a core network;

detecting that a condition for initiating a configuration change at the set of core network control plane access endpoints has been satisfied; and changing, based at least in part on the detecting, a number of core network control plane access endpoints in the set of core network control plane access endpoints to which control plane messages, from the RAN node and transported via the first transport layer protocol endpoint, are delivered without changing a configuration of the first RAN node.

7. The computer-implemented method as recited in claim 6, further comprising:

transmitting, by the first transport layer protocol endpoint, a control plane message which originates at the first RAN node to a particular core network control plane access endpoint of the set of core network control plane access endpoints; and transmitting, by the first transport layer protocol endpoint, a control plane message which originates at the particular core network control plane access endpoint to the first RAN node.

8. The computer-implemented method as recited in claim 6, further comprising:

configuring an additional transport layer protocol endpoint for transmitting control plane messages between the first RAN node and the set of core network control plane access endpoints, without changing a number of core network control plane access endpoints included in the set of core network control plane access endpoints to which control plane messages originating at the first RAN node are transmitted.

9. The computer-implemented method as recited in claim 6, wherein the first transport layer protocol endpoint is configured to process control plane messages transmitted using the Stream Control Transmission Protocol (SCTP).

10. The computer-implemented method as recited in claim 6, wherein a core network control plane access endpoint of the set of core network control plane access endpoints executes one or more of: (a) an Access and Mobility Management Function (AMF) network function of a 5G (Fifth Generation) radio-based technology stack, or (b) a Mobility Management Entity (MME) network function of a 4G (Fourth Generation) radio-based technology stack.

11. The computer-implemented method as recited in claim 6, wherein the RAN node comprises one or more of: (a) a gNodeB base station or (b) an eNodeB base station.

12. The computer-implemented method as recited in claim 6, further comprising:

assigning the first transport layer protocol endpoint as an intermediary for control plane messages originating at a second RAN node and directed to one or more core network control plane access endpoints.

13. The computer-implemented method as recited in claim 6, further comprising:

processing, at a particular core network control plane access endpoint of the set, (a) a first control plane message originating at the first RAN node and (b) a second control plane message originating at a second RAN node.

14. The computer-implemented method as recited in claim 6, wherein a core network control plane access endpoint of the set of core network control plane access endpoints is implemented at a resource managed by the cloud provider network.

15. The computer-implemented method as recited in claim 6, wherein at least a portion of the RAN node is implemented at a resource managed by the cloud provider network.

16. A non-transitory computer-accessible storage medium storing program instructions that when executed on a processor:

cause an intermediary device, of a connectivity service of a suite of services provided via a cloud provider network, to be assigned to for-transmitting control plane messages between (a) a radio access network (RAN) node of a radio-based application and (b) a set of virtualized network functions of a core network of the radio-based application comprising at least a first virtualized network function and a second virtualized network function, wherein individual ones of the virtualized network functions run one or more virtualized network functions of a core network;

detect that a condition for initiating a configuration change at the set of virtualized network functions has been satisfied; and change, based at least in part on detection of the condition, a configuration of the set of virtualized network functions of the core network of the radio-based application, without causing a change to configuration of the RAN node.

17. The non-transitory computer-accessible storage medium as recited in claim 16, wherein the intermediary device is implemented at least in part at a resource, comprising one or more virtual machines or compute instances configured to perform SCTP processing, of a cloud provider network.

18. The non-transitory computer-accessible storage medium as recited in claim 16, wherein the set of virtualized network functions is implemented at least in part at a resource of a cloud provider network.

19. The non-transitory computer-accessible storage medium as recited in claim 16, wherein the RAN node is implemented at least in part at a resource of a cloud provider network.

20. The non-transitory computer-accessible storage medium as recited in claim 16, wherein to detect that the condition has been satisfied, the non-transitory computer-accessible storage medium stores further program instructions that when executed on the processor:

determine that a maintenance event associated with the set of virtualized network functions is scheduled.

* * * * *